United States Patent
Chang et al.

(10) Patent No.: US 6,671,319 B1
(45) Date of Patent: *Dec. 30, 2003

(54) METHODS AND APPARATUS FOR MOTION ESTIMATION USING NEIGHBORING MACROBLOCKS

(75) Inventors: Ching-Fang Chang, San Jose, CA (US); Naofumi Yanagihara, Tokyo (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/497,392

(22) Filed: Feb. 3, 2000

Related U.S. Application Data

(60) Provisional application No. 60/173,410, filed on Dec. 28, 1999.

(51) Int. Cl.[7] ............ H04N 7/12; H04N 11/02; H04N 11/04

(52) U.S. Cl. ............ 375/240.16; 375/240.14; 375/240.21; 375/240.27

(58) Field of Search ............ 375/240.16, 240.14, 375/270.27, 240.21; 322/236

(56) References Cited

U.S. PATENT DOCUMENTS

| | | |
|---|---|---|
| 4,385,363 A | 5/1983 | Widergren et al. |
| 4,845,560 A | 7/1989 | Kondo et al. |
| 5,210,605 A | 5/1993 | Zaccarin et al. |
| 5,341,318 A | 8/1994 | Balanski et al. |
| 5,430,886 A | 7/1995 | Furtek et al. |
| 5,543,932 A | 8/1996 | Chang et al. |
| 5,566,190 A | 10/1996 | Hattori |
| 5,574,661 A | 11/1996 | Cismas |

(List continued on next page.)

OTHER PUBLICATIONS

Dufaux, Frédéric et al., "Motion Estimation Techniques for Digital TV: A Review and a New Contribution," Proceedings of the IEEE, vol. 83, No. 6, Jun. 1995, pp. 858–875.

(List continued on next page.)

*Primary Examiner*—Chris Kelley
*Assistant Examiner*—Charles Parsons
(74) *Attorney, Agent, or Firm*—Finnegan, Henderson, Farabow, Garrett & Dunner L.L.P.

(57) ABSTRACT

Methods and systems for obtaining a motion vector between two frames of video image data are disclosed. Specifically, methods and systems of the present invention may be used to estimate a motion vector for each macroblock of a current frame with respect to a reference frame in a multi-stage operation. In a transcoder, motion estimation may be performed in the compressed domain eliminating the need to fully decode the compressed data in the first format before reencoding in a second format. In a first stage, an application implementing the process of the present invention obtains a motion vector between first and second pictures of video image data in a video sequence. Each picture includes a plurality of supermacroblocks, each having a plurality of macroblocks. For each supermacroblock of the first picture, a match supermacroblock in the second picture is determined that best matches the supermacroblock of the first picture. For each macroblock in the first picture supermacroblock, a macroblock in the second picture is determined that best matches the macroblock in the first picture supermacroblock. Macroblocks are determined by searching the second picture for a candidate macroblock that best matches the macroblock in the first picture supermacroblock. The search begins at a macroblock in the second picture supermacroblock that corresponds to the first macroblock in the first picture supermacroblock and a motion vector is determined based on the candidate macroblock. For the remaining macroblocks in the first picture supermacroblock, motion vectors are estimated based on the macroblocks in supermacroblocks of the second picture that neighbor the candidate macroblock.

52 Claims, 14 Drawing Sheets

U.S. PATENT DOCUMENTS

| | | | |
|---|---|---|---|
| 5,576,772 A | | 11/1996 | Kondo |
| 5,594,679 A | | 1/1997 | Iwata |
| 5,635,994 A | | 6/1997 | Drexler et al. |
| 5,636,152 A | | 6/1997 | Yang et al. |
| 5,640,208 A | | 6/1997 | Fujinami |
| 5,642,438 A | | 6/1997 | Babkin |
| 5,706,059 A | | 1/1998 | Ran et al. |
| 5,710,603 A | | 1/1998 | Lee |
| 5,715,017 A | | 2/1998 | Naito et al. |
| 5,719,642 A | | 2/1998 | Lee |
| 5,721,595 A | | 2/1998 | Chen et al. |
| 5,734,431 A | * | 3/1998 | Dachiku et al. .......... 348/415.1 |
| 5,786,860 A | | 7/1998 | Kim et al. |
| 5,909,511 A | * | 6/1999 | Yoshimoto .................. 382/236 |
| 5,929,915 A | | 7/1999 | Cho |
| 5,943,444 A | | 8/1999 | Shimizu et al. |
| 6,037,986 A | | 3/2000 | Zhang et al. |
| 6,094,225 A | | 7/2000 | Han |
| 6,243,418 B1 | | 6/2001 | Kim |
| 6,249,612 B1 | * | 6/2001 | Ogura ........................ 382/236 |
| 6,295,089 B1 | | 9/2001 | Hoang |
| 6,317,460 B1 | * | 11/2001 | Lee ........................ 375/240.16 |
| 6,462,791 B1 | * | 10/2002 | Zhu ....................... 375/240.27 |
| 6,466,624 B1 | * | 10/2002 | Fogg ...................... 375/240.27 |
| 6,483,876 B1 | * | 11/2002 | Chang et al. .......... 375/240.16 |
| 6,512,795 B1 | * | 1/2003 | Zhang et al. .......... 375/240.27 |

OTHER PUBLICATIONS

Jain, Jaswant R. et al., "Displacement Measurement and Its Application in Interframe Image Coding," IEEE Transactions on Communications, vol. Com–29, No. 12, Dec. 1981, pp. 1799–1808.

Jong, Her–Ming et al., "Parallel Architectures for 3–Step Hierarchical Search Block–Matching Algorithm," IEEE Transactions on Circuits and Systems for Video Technology, vol. 4, No. 4, Aug. 1994, pp. 407–416.

Lee, In–Hong et al., "A Fast Block Matching Algorithm Using Integral Projections," Proceedings Tencon '87 Conference, 1987 IEEE Region 10 Conference, vol. 2 of 3, 1987, pp. 590–594.

Mitchell, Joan L. et al., "MPEG Video Compression Standard," International Thomson Publishing, 1997, pp. 284–286, 301–311.

Ogura Eiji et al., "A Cost Effective Motion Estimation Processor LSI Using A Simple and Efficient Algorithm," IEEE Transactions on Consumer Electronics, vol. 41, No. 3, Aug. 1995, pp. 690–698.

The David Sarnoff Research Center, "MPEG–2: Gains in Picture Quality Lower Cost," 1995, 5 pages.

Seferidis, Vassills et al., "General Approach to BlockMatching Motion Estimation," Optical Engineering, vol. 32, No. 7, Jul. 1993, pp. 1464–1473.

Srinivasan, R. et al., "Predictive Coding Based on Efficient Motion Estimation," IEEE Science, Systems & Services for Communications, 1984, pp. 521–526.

Wang, Bor–Min et al., "Zero Waiting–Cycle Hierarchical Block Matching Algorithm and its Array Architectures," IEEE Transactions on Circuits and Systems for Video Technology, vol. 4, No. 1, Feb. 1994, pp. 18–28.

Wuertele, David, "The Inverted Half–Pel Resolution Block Search," The 1993 Symposium on Image Coding (PCSJ93), pp. 55–56.

C. Loeffler, et al., *Practical Fast 1–D DCT Algorithm With 11 Multiplications*, IEEE, 1989, pp. 988–991.

C. Yamamitsu, et al., *An Experimental Study for a Home–Use Digital VTR*, IEEE Transactions on Consumer Electronics, vol. 35, No. 3, Aug. 1989, pp. 456–456.

*Specifications of Consumer Use of Digital VCR's Using 6.3 mm Magnetic Tape*, HD Digital VCR Conference, Dec. 1994, pp. 23–32.

Sun Deuk Kim, et al., "An Efficient Motion Vector Coding Scheme Based on Minimum Bitrate Prediction", IEEE Transactions on Image Processing, vol. 8, No. 8, Aug. 1999, pp. 1117–1120.

Tien–ying Kuo, et al., "Adaptive Overlapped Block Motion Compensation", Integrated Media Systems Center Department of Electrical Engineering–Systems, University of Southern California, SPIE, vol. 3164, pp. 401–412.

Andre Zaccarin, et al, "Fast Algorithms for Block Motion Estimation", 1992, IEEE, pp. 449–452.

* cited by examiner

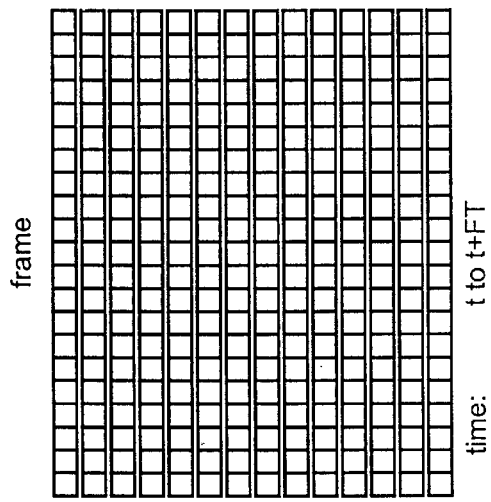
FIG. 1A
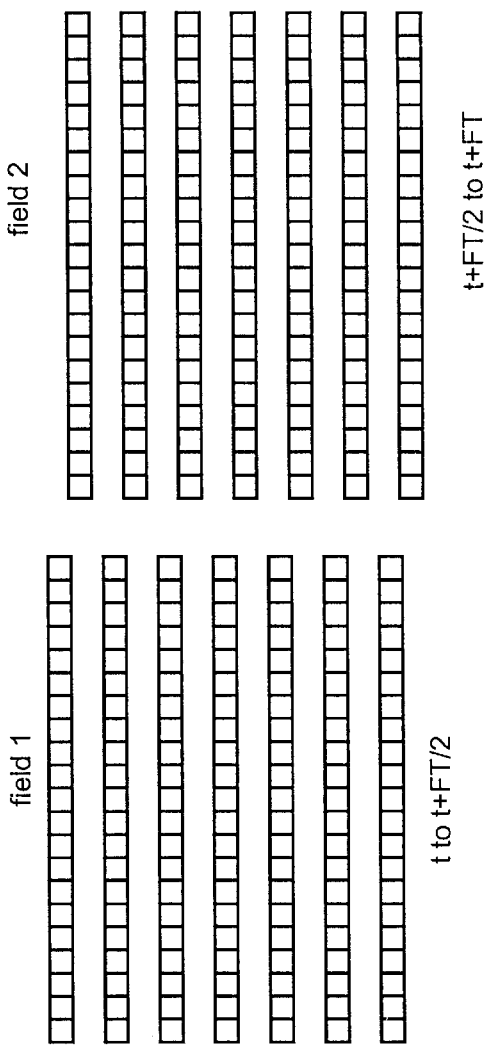
FIG. 1B
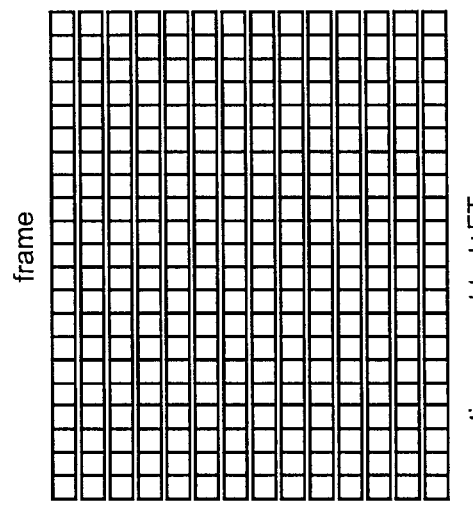

| 1 | *3* | 2 | *5* | 4 | *7* | 6 | *9* | 8 | *11* | 10 | *13* | 12 | *15* | 14 | 16 |
|---|---|---|---|---|---|---|---|---|---|---|---|---|---|---|---|
| <u>18</u> | *21* | <u>20</u> | *25* | <u>24</u> | *29* | <u>28</u> | *33* | <u>32</u> | *37* | <u>36</u> | *41* | <u>40</u> | *45* | <u>44</u> | <u>48</u> |
| 17 | *22* | 19 | *26* | 23 | *30* | 27 | *34* | 31 | *38* | 35 | *42* | 39 | *46* | 43 | 47 |
| <u>50</u> | *53* | <u>52</u> | *57* | <u>56</u> | *61* | <u>60</u> | *65* | <u>64</u> | *69* | <u>68</u> | *73* | <u>72</u> | *77* | <u>76</u> | <u>80</u> |
| 49 | *54* | 51 | *58* | 55 | *62* | 59 | *66* | 63 | *70* | 67 | *74* | 71 | *78* | 75 | 79 |
| 81 | *83* | 82 | *85* | 84 | *87* | 86 | *89* | 88 | *91* | 90 | *93* | 92 | *95* | 94 | 96 |

N: MB which performs regular search
*N*: MB which utilizes the MVs of left and right neighboring MBs
<u>N</u>: MB which utilizes the MVs of upper and lower neighboring MBs

FIG. 10

| Case | Y | To determine motion vector |
|---|---|---|
| 0 | $Y = 0$ | Choose $MV_1$ |
| 1 | $0 < Y \leq T_1$ | Choose $\min\{$Intra, $MV_1$, $MV_2\}$ |
| 2 | $T_1 < Y \leq T_2$ | Choose $\min\{$Intra, $MV_1$, $MV_2$, avg$(MV_1, MV_2)\}$ |
| 3 | $T_2 < Y \leq T_3$ | Perform field or frame search according to $MV_1$ or $MV_2$, starting search at avg$(MV_1, MV_2)$ |
| 4 | $T_3 < Y$ | Perform regular search |

FIG. 11

METHODS AND APPARATUS FOR MOTION ESTIMATION USING NEIGHBORING MACROBLOCKS

CROSS-REFERENCE TO RELATED APPLICATIONS

This application claims the benefit of U.S. Provisional Application No. 60/173,410, filed Dec. 28, 1999, entitled "Methods and Apparatus for Motion Estimation in Compressed Domain."

This application is also related to commonly-assigned copending applications Ser. No. 09/497,394, filed Feb. 3, 2000, entitled "Methods and Apparatus for Motion Estimation in Compressed Domain," and Ser. No. 09/497,434, filed Feb. 3, 2000, now U.S. Pat. No. 6,483,876, issued Nov. 19, 2002, entitled "Methods and Apparatus for Reduction of Prediction Modes in Motion Estimation," both of which are hereby expressly incorporated by reference.

BACKGROUND OF THE INVENTION

The present invention relates generally to methods and apparatus for motion estimation for video image processing, and in particular, improved methods and apparatus for determining motion vectors between video image pictures with a hierarchical motion estimation technique using block-matching and integral projection data.

Advancements in digital technology have produced a number of digital video applications. Digital video is currently used in digital and high definition TV, camcorders, videoconferencing, computer imaging, and high-quality video tape recorders. Uncompressed digital video signals constitute a huge amount of data and therefore require a large amount of bandwidth and memory to store and transmit. Many digital video systems, therefore, reduce the amount of digital video data by employing data compression techniques that are optimized for particular applications. Digital compression devices are commonly referred to as "encoders"; devices that perform decompression are referred to as "decoders". Devices that perform both encoding and decoding are referred to as "codecs".

In the interest of standardizing methods for motion picture video compression, the Motion Picture Experts Group (MPEG) issued a number of standards. MPEG-1 is a compression algorithm intended for video devices having intermediate data rates. MPEG-2 is a compression algorithm for devices using higher data rates, such as digital high-definition TV (HDTV), direct broadcast satellite systems (DBSS), cable TV (CATV), and serial storage media such as digital video tape recorders (VTR). Digital Video (DV) format is another format used widely in consumer video products, such as digital camcorders. The DV format is further explained in the SD Specifications of Consumer-Use Digital VCRs dated December 1994.

A video sequence is composed of a series of still pictures taken at closely spaced intervals in time that are sequentially displayed to provide the illusion of continuous motion. Each picture may be described as a two-dimensional array of samples, or "pixels". Each pixel describes a specific location in the picture in terms of brightness and hue. Each horizontal line of pixels in the two-dimensional picture is called a raster line. Pictures may be comprised of a single frame or two fields.

When sampling or displaying a frame of video, the video frame may be "interlaced" or "progressive." Progressive video consists of frames in which the raster lines are sequential in time, as shown in FIG. 1A. The MPEG-1 standard allows only progressive frames. Alternatively, each frame may be divided into two interlaced fields, as shown in FIG. 1B. Each field has half the lines in the full frame and the fields are interleaved such that alternate lines in the frame belong to alternative fields. In an interlaced frame composed of two fields, one field is referred to as the "top" field, while the other is called the "bottom" field. The MPEG-2 standard allows both progressive and interlaced video.

One of the ways MPEG applications achieve data compression is to take advantage of the redundancy between neighboring pictures of a video sequence. Since neighboring pictures tend to contain similar information, describing the difference between neighboring pictures typically requires less data than describing the new picture. If there is no motion between neighboring pictures, for example, coding the difference (zero) requires less data than recoding the entire new picture.

An MPEG video sequence is comprised of one or more groups of pictures, each group of which is composed of one or more pictures of type I-, P-, or B-. Intra-coded pictures, or "I-pictures," are coded independently without reference to any other pictures. Predictive-coded pictures, or "P-pictures," use information from preceding reference pictures, while bidirectionally predictive-coded pictures, or "B-pictures," may use information from preceding or upcoming pictures, both, or neither.

Motion estimation is the process of estimating the displacement of a portion of an image between neighboring pictures. For example, a moving soccer ball will appear in different locations in adjacent pictures. Displacement is described as the motion vectors that give the best match between a specified region, e.g., the ball, in the current picture and the corresponding displaced region in a preceding or upcoming reference picture. The difference between the specified region in the current picture and the corresponding displaced region in the reference picture is referred to as "residue".

In general, two known types of motion estimation methods used to estimate the motion vectors are pixel-recursive algorithms and block-matching algorithms. Pixel-recursive techniques predict the displacement of each pixel iteratively from corresponding pixels in neighboring frames. Block-matching algorithms, on the other hand, estimate the displacement between frames on a block-by-block basis and choose vectors that minimize the difference.

In conventional block-matching processes, the current image to be encoded is divided into equal-sized blocks of pixel information. In MPEG-1 and MPEG-2 video compression standards, for example, the pixels are grouped into "macroblocks," each consisting of a 16×16 sample array of luminance samples together with one 8×8 block of samples for each of the two chrominance components. The 16×16 array of luminance samples further comprises four 8×8 blocks that are typically used as input blocks to the compression models.

FIG. 2 illustrates one iteration of a conventional block-matching process. Current picture 220 is shown divided into blocks. Each block can be any size; however, in an MPEG device, for example, current picture 220 would typically be divided into blocks each consisting of 16×16-sized macroblocks. To code current picture 220, each block in current picture 220 is coded in terms of its difference from a block in a previous picture 210 or upcoming picture 230. In each iteration of a block-matching process, current block 200 is compared with similar-sized "candidate" blocks within search range 215 of preceding picture 210 or search range 235 of upcoming picture 230. The candidate block of the preceding or upcoming picture that is determined to have the smallest difference with respect to current block 200 is selected as the reference block, shown in FIG. 2 as reference block 250. The motion vectors and residues between reference block 250 and current block 200 are computed and coded. Current picture 220 can be restored during decompression using the coding for each block of reference picture 210 as well as motion vectors and residues for each block of current picture 220. The motion vectors associated with the preceding reference picture are called forward motion vectors, whereas those associated with the upcoming reference picture are called backward motion vectors.

Difference between blocks may be calculated using any one of several known criterion, however, most methods generally minimize error or maximize correlation. Because most correlation techniques are computationally intensive, error-calculating methods are more commonly used. Examples of error-calculating measures include mean square error (MSE), mean absolute distortion (MAD), and sum of absolute distortions (SAD). These criteria are described in Joan L. Mitchell et al., *MPEG Video Compression Standard*, International Thomson Publishing (1997), pp. 284–86.

A block-matching algorithm that compares the current block to every candidate block within the search range is called a "full search". In general, larger search areas generally produce a more accurate displacement vector, however, the computational complexity of a full search is proportional to the size of the search area and is too slow for some applications. A full search block-matching algorithm applied on a macroblock of size 16×16 pixels over a search range of ±N pixels with one pixel accuracy, for example, requires $(2 \times N+1)^2$ block comparisons. For N=16, 1089 16×16 block comparisons are required. Because each block comparison requires 16×16, or 256, calculations, this method is computationally intensive and operationally very slow. Techniques that simply reduce the size of the search area, however, run a greater risk of failing to find the optimal matching block.

As a result, there has been much emphasis on producing fast algorithms for finding the matching block within a wide search range. Several of these techniques are described in Mitchell et al., pp. 301–11. Most fast search techniques gain speed by computing the displacement only for a sparse sampling of the full search area. The 2-D logarithmic search, for example, reduces the number of computations by computing the MSE for sparsely-spaced candidates, and then successively searching the closer spaced candidates surrounding the best candidate found in the previous iteration. In a conjugate direction search, the algorithm searches in a horizontal direction until a minimum distortion is found. Then, proceeding from that point, the algorithm searches in a vertical direction until a minimum is found. Both of these methods are faster than a full search but frequently fail to locate the optimal matching block.

Another method for reducing the amount of computation in a full search is to calculate the displacement between blocks using integral projection data rather than directly using spatial domain pixel information. An integral projection of pixel information is a one-dimensional array of sums of image pixel values along a horizontal or vertical direction. Using two 1-D horizontal and vertical projection arrays rather than the 2-dimensional array of pixel information in a block-matching algorithm significantly reduces the number of computations of each block-matching. This technique is described in a paper by I. H. Lee and R. H. Park entitled "Fast Block Matching Algorithms Using Integral Projections," Proc. Tencon '87 Conf., 1987, pp. 590–594.

Other methods for overcoming the disadvantages of a full search have employed hierarchical search techniques. In a first stage, for example, a coarse search is performed over a reasonably large area. In successive stages of a conventional hierarchical search, the size of the search area is reduced. One example of a three-step hierarchical search is described in H. M. Jong et al., "Parallel Architectures for 3-Step Hierarchical Search Block-Matching Algorithm," IEEE Trans. On Circuits and Systems for Video Technology, Vol. 4, August 1994, pp. 407–416. The hierarchical search described in Jong et al. is inadequate for some applications because the coarse search does not utilize all of the pixel information and thus may form an incorrect starting point for the finer search. Another type of hierarchical search is disclosed in U.S. patent application No. 09/093,307, to Chang et al., filed on Jun. 9, 1998, entitled "Hierarchical Motion Estimation Process and System Using Block-Matching and Integral Projection" ("Chang I"), the contents of which are hereby expressly incorporated by reference.

Fast motion estimation techniques are particularly useful when converting from one digital video format to another. Digital video is stored in encoded, compressed form. When converting from one format to another using conventional devices, the digital video must first be decompressed and decoded to its original pixel form and then subsequently encoded and compressed for storage or transmission in the new format. Conversion techniques requiring that digital video be fully decoded are very time-consuming.

The present invention provides improved methods and apparatus for performing motion estimation using a multi-tiered search technique that minimizes the number of operations while maintaining the quality of the motion vector. In addition, the present invention provides methods and apparatus for motion estimation that allow digital video data conversion from one format to a second format without full reduction to pixel data thereby greatly reducing the time required for data format conversion.

SUMMARY OF THE INVENTION

Methods, systems, apparatus, and computer program products consistent with the present invention obtain a motion vector between first and second pictures of video image data in a video sequence. Each picture includes a plurality of macroblocks. First and second motion vectors based on the first and second macroblocks are determined using a first and second search method. A third motion vector is estimated using the neighboring first and second macroblocks. A fourth motion vector for a fourth macroblock is estimated using a third search method and a fifth motion vector for a fifth macroblock neighboring both the first and fourth macroblocks is estimated based on the first and fourth motion vectors. A sixth motion vector for a sixth macroblock is determined using a fourth search method; and a seventh motion vector for a seventh macroblock is estimated based on the sixth motion vector and at least one of the first, second and fourth motion vectors. An eighth motion vector for a eighth macroblock neighboring the sixth macroblock and at least one of the first, second and fourth macroblocks is estimated based on the sixth motion vector and at least one of the first, second and fourth motion vectors. A ninth motion vector is estimated based on at least two of the first eight motion vectors. In methods and systems consistent with the present invention, the macroblock is encoded in one of several ways depending on thresholds. For example, the minimum of the first motion vector, the second motion vector, or an average of the first and second motion vectors may be encoded or a macroblock may be encoded independently of other pictures.

BRIEF DESCRIPTION OF THE DRAWINGS

The accompanying drawings, which are incorporated in and constitute a part of this specification, illustrate the invention and, together with the description, serve to explain the principles of the invention.

FIG. 1A is a diagram illustrating a frame in progressive video;

FIG. 1B is a series of diagrams illustrating a frame divided into two interlaced fields;

FIG. 10 is a chart describing one method for determining motion vectors using motion vectors for neighboring macroblocks consistent with the present invention;

FIG. 11 is a chart illustrating pictorially one example of how motion vectors may be determined using motion vectors for neighboring macroblocks consistent with the present invention;

DESCRIPTION OF THE PREFERRED EMBODIMENTS

Reference will now be made in detail to preferred implementations consistent with the present invention, an example of which is illustrated in the accompanying drawings.

Motion estimation techniques compress the amount of data needed to represent a digital video sequence by encoding one picture in terms of its difference from a neighboring picture rather than encoding each picture in its entirety. When the sequence is replayed, the decoder reconstructs the current picture using the reference picture and the motion vectors.

There are some instances where it may be desired to convert video sequences currently in one format into another format. One method for doing so is to completely decode the video sequences into pixel information using a decoder and recode the pixel information into the second format using an encoder. When encoding in the second format, motion estimation is performed in the pixel domain on pixel information.

Figure 2:
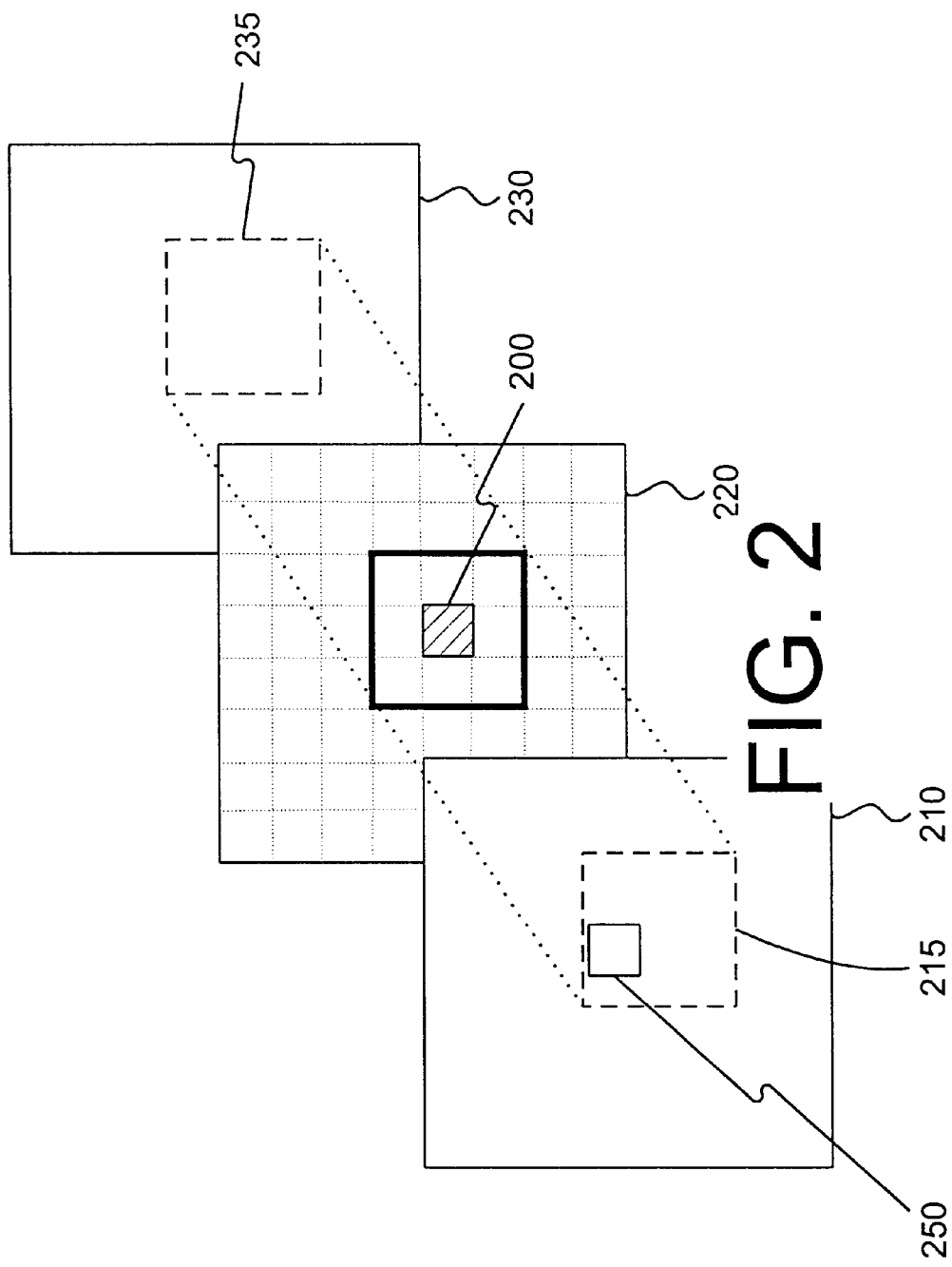
FIG. 2 is a diagram illustrating a prior art block-matching technique.
Figure 3:
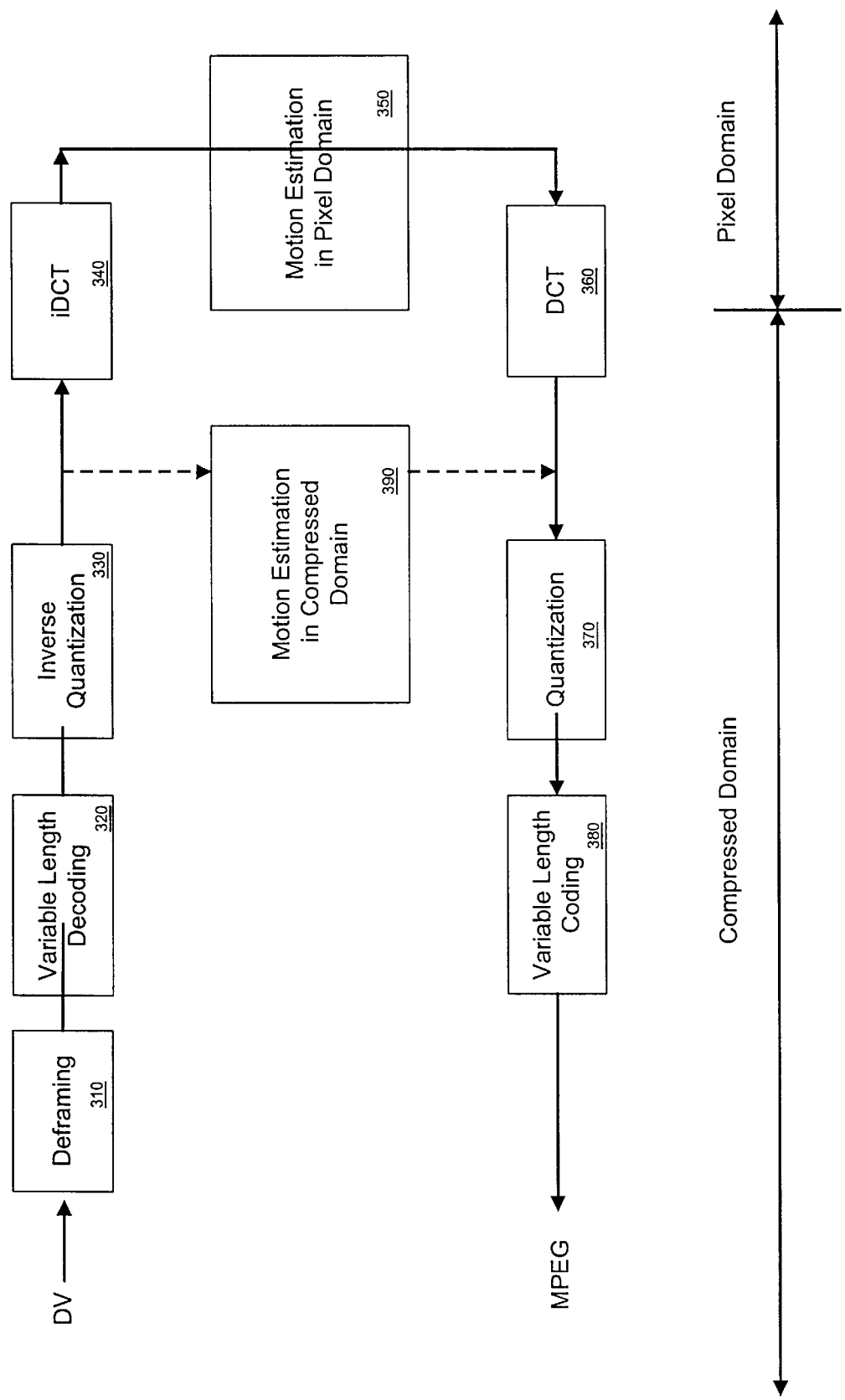
FIG. 3 is a diagram showing a system for converting digital video from a DV format into an MPEG format.

FIG. 3 shows an example of a system for converting digital video from a DV format into an MPEG format. In the example shown in FIG. 3, digital video is received in compressed format and deframed (step 310). The resulting data is subjected to variable length decoding (step 320), inverse quantization (step 330), and inverse discrete cosine transform (iDCT) (step 340). The result following the iDCT is pixel information.

To recode the pixel information in a second format (in this case, MPEG), the pixel information is compressed using motion estimation (step 350), a discrete cosine transform (DCT) (step 360), quantization (step 370), and variable length coding (step 380). The result is video data in the second format, in this case, MPEG.

Transcoders are devices that convert digital video from one format to another. For example, transcoders perform the decoding and encoding process such as the example shown in FIG. 3. One method for improving the performance of transcoders is to develop methods for converting one format of data to a second format without performing the entire decoding and re-encoding processes. As shown in FIG. 3, the computation-intensive steps of iDCT and DCT may be eliminated if a transcoder can perform motion estimation on compressed data. In step 390, for example, motion estimation is performed on decoded data that has not yet undergone the iDCT stage. Data in step 390 may still be described as "compressed" and requires different calculations than pixel information.

In a method consistent with the present invention, a motion vector is estimated for each block of a current picture with respect to a reference picture using a multi-stage operation. As explained in more detail below, the motion estimation methods described herein may be used in both pixel and compressed domains. In a first stage, an application implementing the process of the present invention coarsely searches a reference frame to obtain a candidate supermacroblock that best approximates a supermacroblock in a current frame. In a second stage, the supermacroblock is divided into a plurality of macroblock components. The first macroblock of each supermacroblock in a current frame is used as a starting point for a second search. The motion vector resulting from the second search may be further fine-tuned by an optional third search.

If motion vectors are determined for field data, a test is performed to determine whether a motion vector for the frame comprised of the two fields would produce a better result. If a difference between the field motion vectors is less than a dynamic threshold, a frame search is performed, and the motion vector for the frame may be used instead of the motion vector for the fields. Motion vectors for the remaining macroblocks in a supermacroblock are estimated based on neighboring blocks.

A. Multi-Tiered Motion Estimation Process with Frame Data

In one embodiment, methods consistent with the present invention are used to estimate motion vectors in a transcoder for converting digital video image data in the DV format to data in an MPEG-1 or MPEG-2 progressive format. Both MPEG-1 and MPEG-2/progressive formats are frame-based, therefore, in this embodiment, motion vectors are calculated for frames of data.

Figure 4:
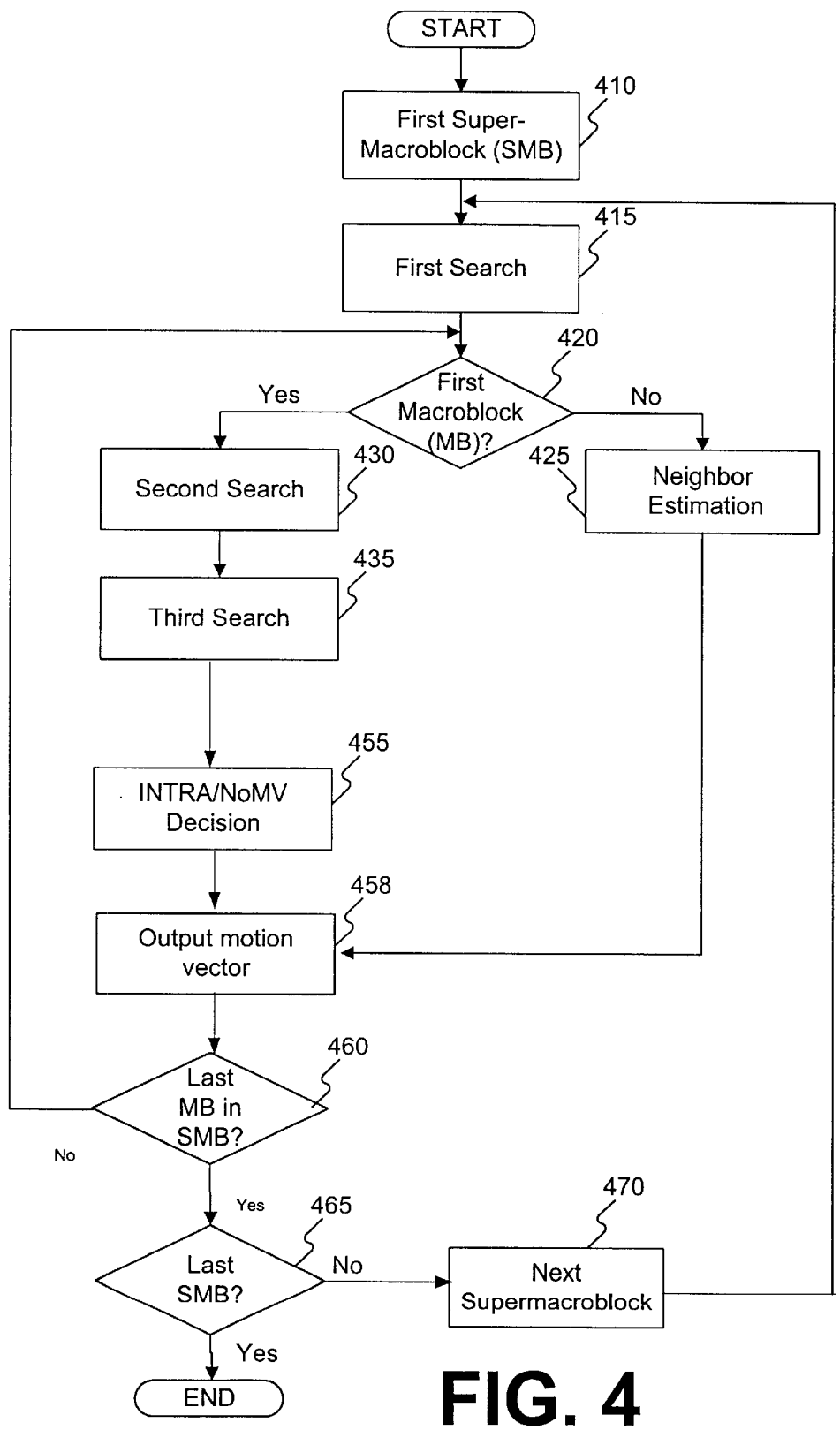
FIG. 4 is a flow diagram showing a method of determining motion vectors consistent with the present invention.

FIG. 4 contains a flow chart illustrating a method for estimating motion vectors for each macroblock of a current picture using a multi-tiered searching method consistent with the present invention.

Data representing a current picture is divided into data representing supermacroblocks. If motion estimation is performed in the pixel domain (step 350 of FIG. 3), the data will be pixel data. If motion estimation is performed in the compressed domain (step 390 of FIG. 3), motion estimation will be performed using DCT coefficient data representing supermacroblocks.

Starting with a first supermacroblock (step 410), the reference picture is searched for a candidate supermacroblock that best matches the current supermacroblock (step 415). A "best" candidate supermacroblock is defined as the supermacroblock that produces the best comparison values, that is, the least error or greatest correlation when compared with the current supermacroblock using any known error calculation or correlation determination method. For the sake of convenience, the following exemplary embodiments are described using SAD, however, it should be understood that in each example, other error calculation or correlation determination methods may be used instead. The search range over which the search is performed may vary. Generally, a larger search range will increase accuracy but result in additional computations that may affect performance.

A best candidate supermacroblock may be obtained using any available searching technique including, for example, the full search and other searches described above. In one embodiment of the present invention, the "best" candidate supermacroblock is selected using the motion estimation method described in U.S. patent application No. 09/081,279, to Chang et al. ("Chang II"), filed on May 20, 1998, entitled "Motion Estimation Process and System Using Sparse Block-Matching and Integral Projection," the contents of which are hereby expressly incorporated by reference.

Figure 5:
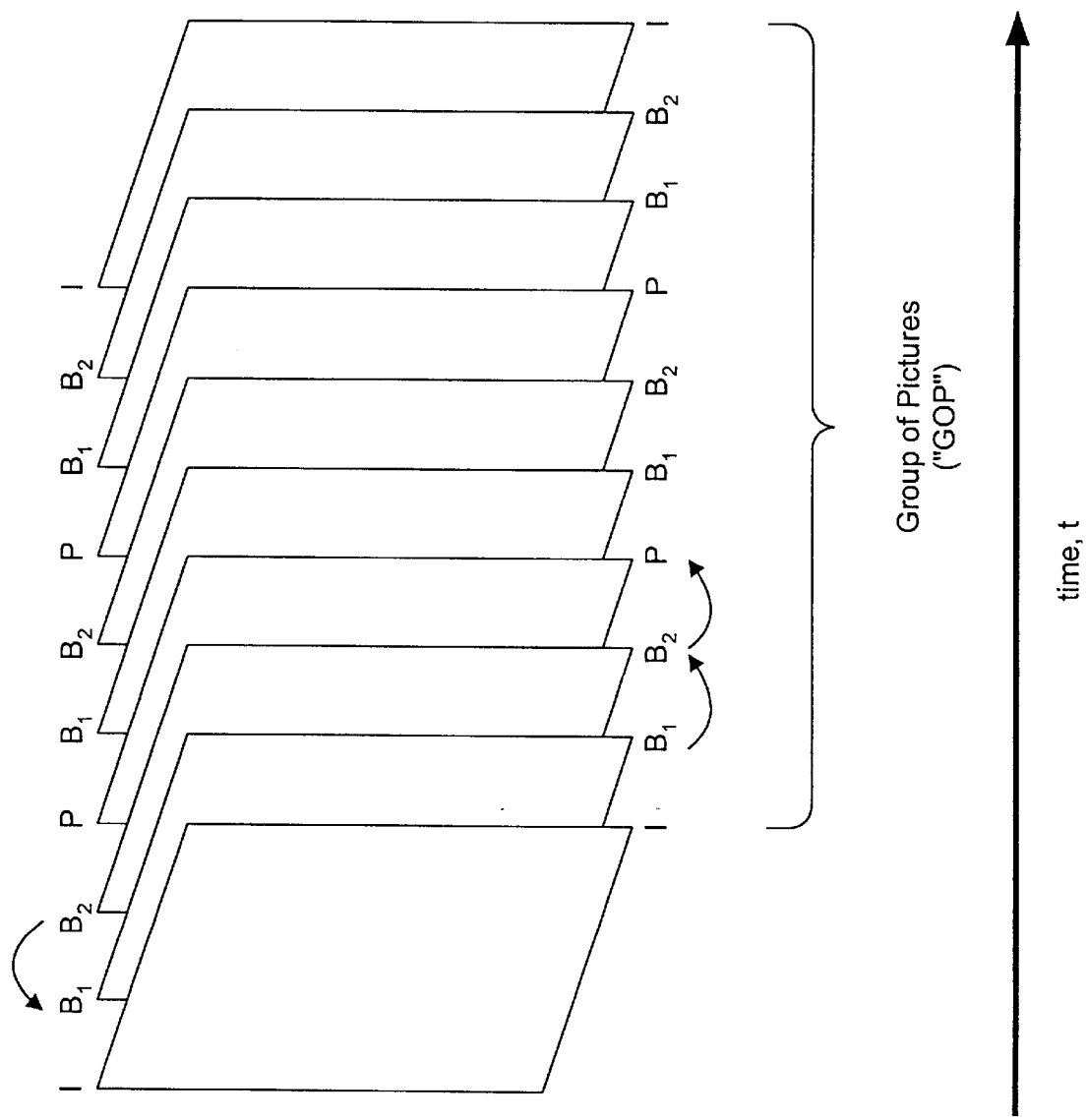
FIG. 5 is a diagram showing a video sequence.

In another embodiment of the present invention, described in more detail below, "best" candidate supermacroblocks are selected using a telescopic search. Telescopic searches use the motion vector determined for a preceding picture to decrease the search range. As described above, MPEG video sequences are composed of a series of still pictures or "frames" taken at closely spaced intervals in time that are sequentially displayed to provide the illusion of continuous motion. Each group of pictures is composed of three types of pictures, I-pictures (intra-coded), P-pictures (predictive-coded), and B-pictures (bidirectionally-coded), as shown in FIG. 5. I-pictures are coded independently, without reference to the other pictures. P- and B-pictures are compressed by coding the differences between the picture and reference I- or P-pictures. P-pictures are coded with response to preceding I- or P-pictures, while B-pictures may be coded from preceding or succeeding pictures.

In a telescopic search, the I-picture is coded independently. Then, the I-picture is used as a reference frame. Candidate supermacroblocks in the I reference frame that best match supermacroblocks in the $B_1$ picture are found using, for example, a full search, and forward motion vectors for the $B_1$ picture are determined. The search for the forward motion vector of the $B_2$ picture begins with the motion vector for the $B_1$ picture and the forward motion vector of the P picture is based on the forward motion vector of the $B_2$ picture. In a similar fashion, the backward motion vector of the $B_1$ picture is determined by a search beginning at the backward motion vector for the $B_2$ picture.

Regardless of the search technique used, the current supermacroblock and candidate supermacroblocks may be compared using projection data to further reduce the number of necessary calculations. For example, during any block-matching search technique, each time the current block is compared with a candidate block, a difference is calculated. Using sum of absolute distortions (SAD) as the matching criteria, for example, the differences may be defined as follows:

$$SAD(i, j) = \sum_{x=0}^{N-1} \sum_{y=0}^{M-1} |r(x, y) - s(x + i, y + j)|$$

for $-A \leq i \leq A$ and $-B \leq j \leq +B$, where r is the current block, s is the candidate block, N×M is the block size, and A and B define the search range. The (i,j) pair that produces a minimum value for SAD (i,j) defines the motion vector of the current block. A motion vector of (1,1), for example, means that a block in the reference frame one pixel horizontally to the right and one pixel vertically below the corresponding location of current block in the reference frame closely resembles current block.

Figure 6:
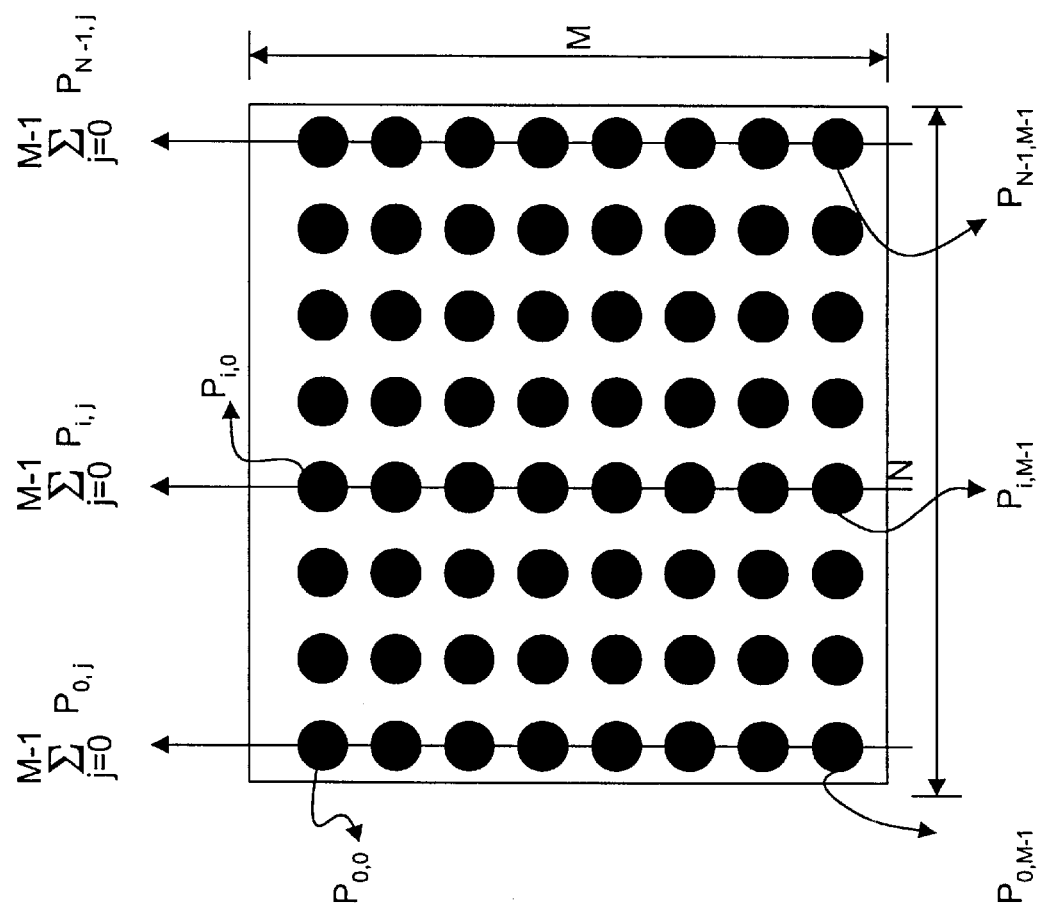
FIG. 6 demonstrates how 8-point vertical integral projections may be calculated from 8×8 pixel data.

When comparing an N×N current block to an N×N candidate block using pixel information and a difference calculation such as SAD described above, N×N calculations are required. It is possible, however, to compare the two blocks using other information, such as integral projections. An integral projection of pixel information is a sum of some number of image pixel values along a certain horizontal or vertical direction. FIG. 6, for example, shows how to calculate 8-point vertical integral projections from 8×8 pixel data.

Figure 7A:
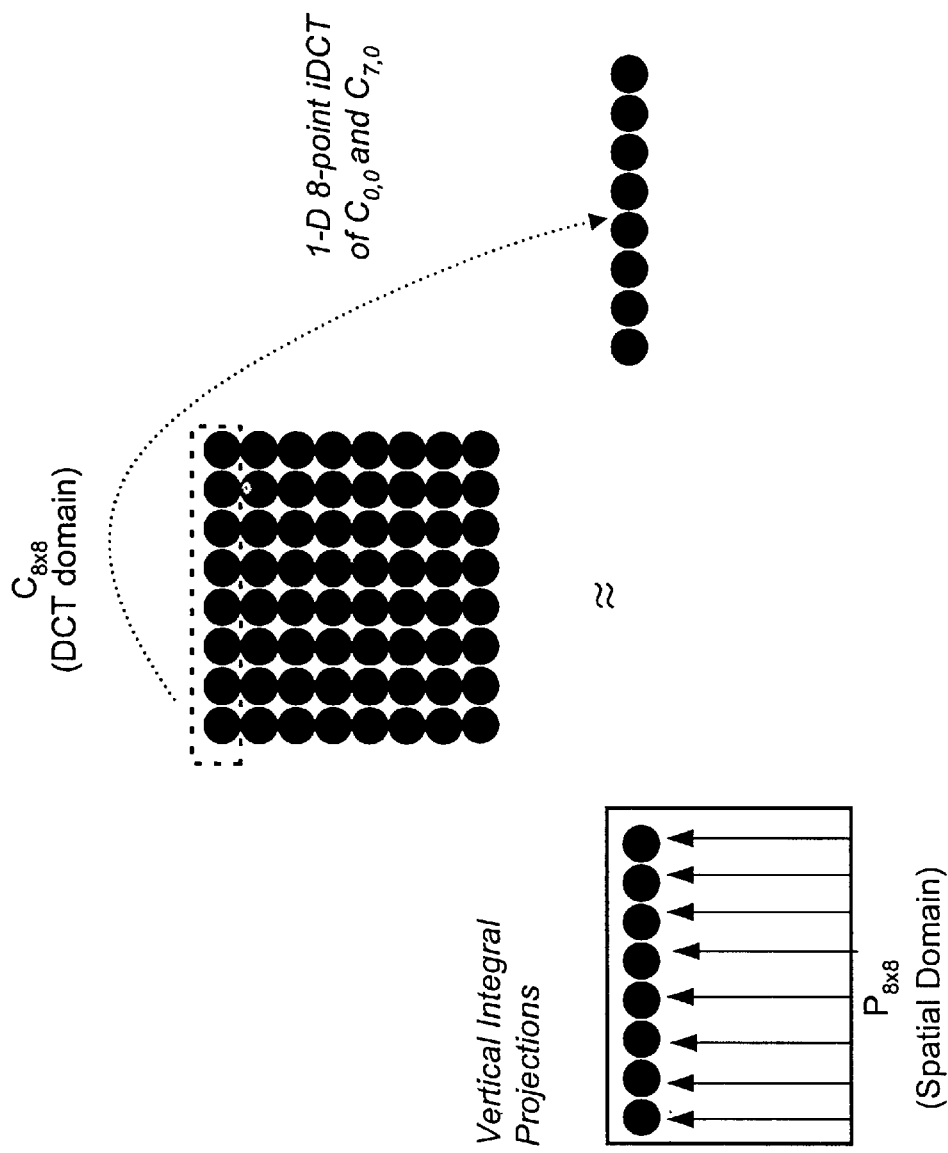
FIG. 7a illustrates, for example, that 8-point vertical projection data may be calculated either by summing columns of an 8×8 array of pixel data, or by performing a 1-D 8-point iDCT on row 0 of DCT coefficients.
Figure 7B:
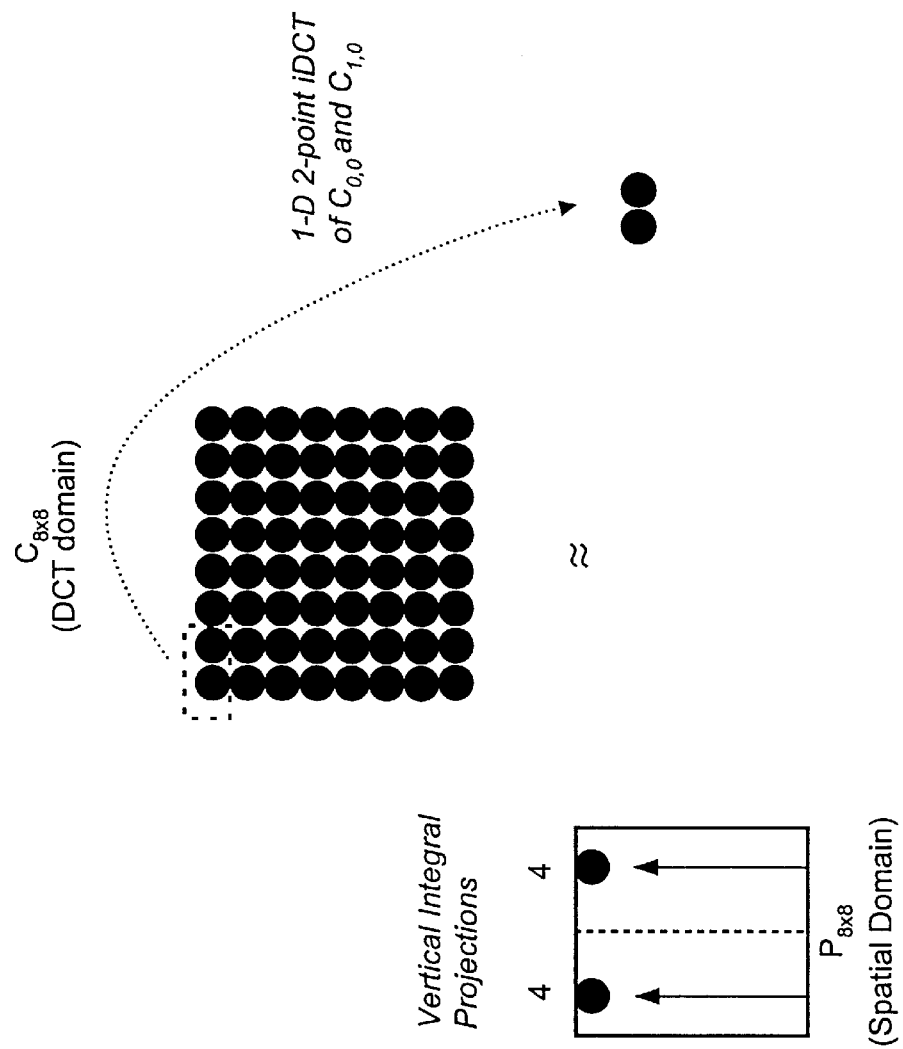
FIG. 7b illustrates, for example, that 2-point vertical projection data may be calculated either by summing four columns of an 8×8 array of pixel data, or approximately by performing a 1-D 2-point iDCT on DCT coefficients $C_{0,0}$

Integral projection information can be obtained by calculating one-dimensional integral projection arrays from either pixel information or discrete cosine transform (DCT) coefficient data. FIG. 7a illustrates, for example, that 8-point vertical projection data may be calculated either by summing columns of an 8×8 array of pixel data, or by performing a 1-D 8-point iDCT on row 0 of DCT coefficients, since these two calculations produce the same result. Similarly, as illustrated in FIG. 7b, the 2-point vertical projection data may be calculated either by summing four columns of an 8×8 array of pixel data, or approximately by performing a 1-D 2-point iDCT on DCT coefficients $C_{0,0}$ and $C_{1,0}$.

If integral projection information is calculated, the resulting sums may $$SAD_v(i, j) = \sum_{x=0}^{N-1} |R_v(x) - S_v(x + i, j)|$$

then be used in the difference calculation. For example, using sum of absolute distortions (SAD) as the matching criteria, and M-point vertical projection difference is then calculated as follows:
where $-A \leq i \leq +A$, $-B \leq j \leq +B$, and j is an integer multiple of Z. In addition, $R_v(x)$ is the vertical projection for the xth column of the current block and $S_v(x+i,j)$ is the vertical projection or sum of the (x+i)th column of the candidate block starting at row j.

Referring again to FIG. 4, after a best supermacroblock in the reference frame is determined, a motion vector for each macroblock (MB) in the current supermacroblock is determined. The current supermacroblock may consist of M×N macroblocks, however, the example described herein assumes that Aft each supermacroblock consists of four macroblocks in a square configuration. For each macroblock, the best candidate macroblock in a reference frame may be determined by either searching or estimation (step 420). In embodiments consistent with the present invention, for a first macroblock of the supermacroblock in the current frame, the best candidate macroblock in a reference frame is determined using a second search technique (step 430). The motion vector found in the first search (step 415) is used as the starting point of the second search. The second search technique used may be any conventional search technique such as, for example, full search. In one embodiment of the present invention, the "best" candidate macroblock is selected using the method described in Chang II. As mentioned above, the search range over which the search is performed may vary. Generally, a larger search range will increase accuracy but requires additional computations that may affect performance.

Figure 8:
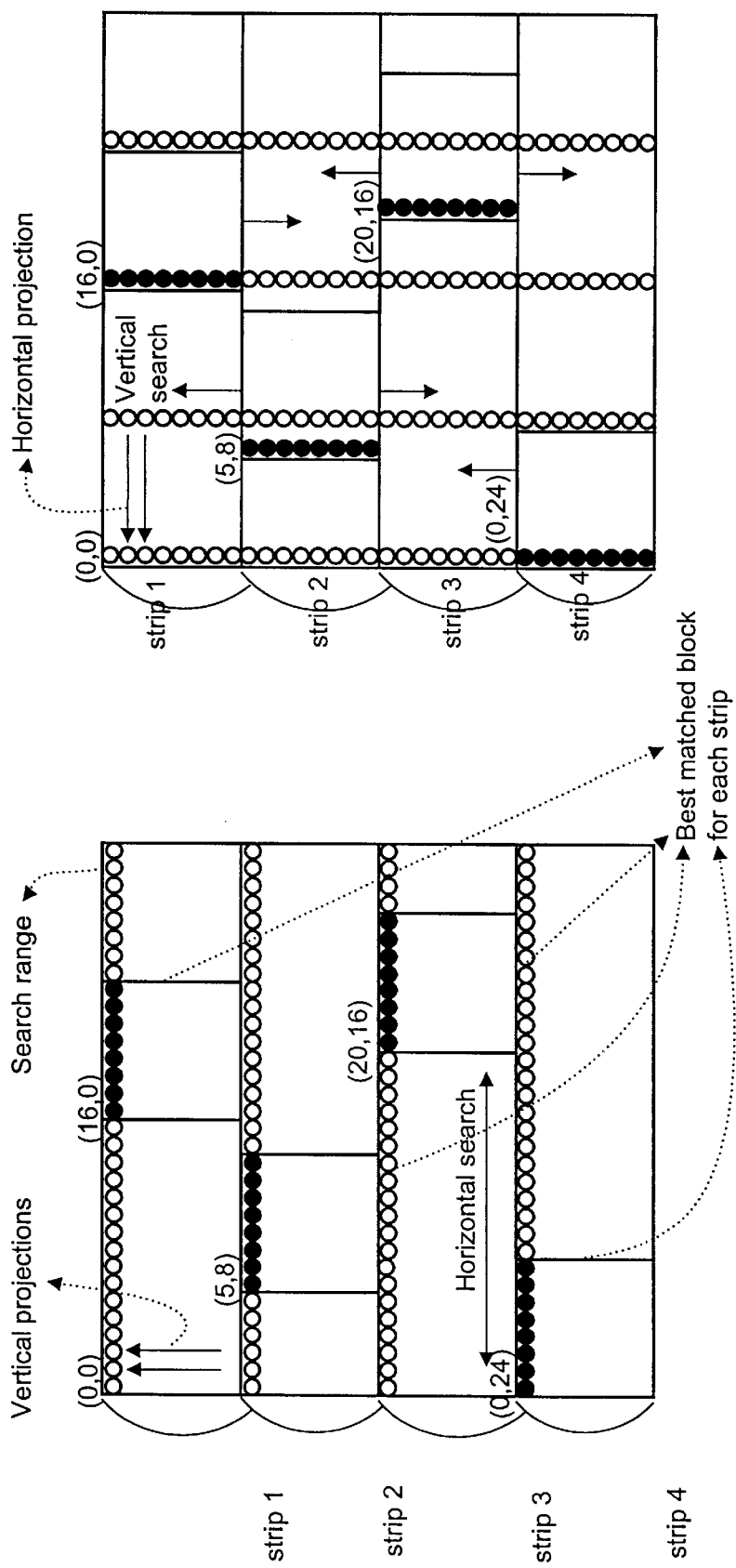
FIG. 8 shows a method for searching in both the horizontal and vertical directions using projection data.

Generally, most search techniques used will search for the best candidate macroblock in both the horizontal and vertical directions. The search process can be further improved by using projection data. FIG. 8 illustrates one example of a search process for a best candidate 8×8 macroblock using 8-point vertical and horizontal projection data. As shown on the left of FIG. 8, the frame of data is divided into horizontal strips of 8 rows. Vertical projection data is computed for each strip. To calculate 8-point vertical frame projections on compressed data, a one-dimensional 8-point horizontal iDCT may be applied to the first row of the 8×8 DCT block. The candidate macroblock in each strip that best matches the current macroblock is determined by, for example, locating the macroblock that produces the lowest SAD when compared to the current macroblock. A best candidate macroblock for each strip is determined.

The frame is then searched in the vertical direction using horizontal projection data as shown on the right side of FIG. 8. To obtain 8-point horizontal frame projections, a 1-D 8-point vertical iDCT may be applied to the first column of the 8×8 DCT block. Beginning at the best candidate macroblock for each strip, the frame is searched vertically +/−4 pixels for a best candidate in the vertical column defined by the best candidate from the horizontal search. The macroblock in the reference frame that results in the lowest SAD among all macroblocks searched by the vertical search when compared with the current macroblock is used to compute the motion vector.

The results of the second search may be used as a starting point for an additional, optional third search (step 435). The third search will be performed using the best candidate macroblock determined in step 430 as the starting macroblock for this search stage. As mentioned above with respect to other searches described, the search range over which the search is performed may vary. Generally, a larger search range will increase accuracy but result in additional computations that may affect performance. However, at this stage, the objective is to further fine tune the motion vector. Therefore, a search range of approximately +/−0.5 pixels is recommended.

The process continues with step 455 which is the Intra/NoMV decision. The Intra mode means the macroblock is encoded independently without reference to the reference pictures. The SAD for INTRA mode is the difference between the pixel data of the current MB and the average value of that MB. It can be expressed by $$SAD_{INTRA} = \sum_{x=0}^{N-1}\sum_{y=0}^{M-1} |p(x, y) - p_{avg}|,$$

where P(x,y) is the pixel value of the current MB, $$P_{avg} = \frac{1}{N*M}\sum_{x=0}^{N-1}\sum_{y=0}^{M-1} p(x, y)$$

is the average pixel value of the MB, and N×M is the block size. When the SAD for intra-coding the macroblock is small, Intra mode, that is, coding the macroblock independently or without reference to another macroblock, may produce better image quality than motion-predicted mode. Therefore, the Intra mode is given higher priority over encoding the motion vector when the SAD is small.

The NoMV mode is a special case when the motion vector is zero. Since it takes the fewest number of bits to encode the zero motion vector, the zero motion vector is given higher priority than other motion vectors. In step 458, the motion vector is stored or output.

If the process has just determined the motion vector for the last macroblock in the current supermacroblock (step 460), the process continues with step 465. Otherwise, the process continues by determining motion vectors for the other macroblocks in the current supermacroblock (step 420).

Methods consistent with the present invention may determine motion vectors for the second and succeeding macroblocks of a supermacroblock based on the motion vectors from neighboring macroblocks (step 425). The process may determine these motion vectors based on any suitable combination of neighboring motion vectors including, for example, the average of two nearest neighbors. In one embodiment of the current invention, the motion vectors are determined using the method of utilizing motion vectors from neighboring motion vectors described below in section C.

When the process has determined the motion vector for the last macroblock in the current supermacroblock, the process continues with step 465. If the process has determined the motion vectors for the last supermacroblock in a given frame or field (step 465), the process terminates. Otherwise, the process chooses a next supermacroblock (step 470) and continues with step 415.

B. Multi-Tiered Motion Estimation Process with Field Data

As mentioned above, the MPEG-2 standard allows both progressive and interlaced video. Interlaced video may be encoded as two fields, a "top" field and a "bottom" field, or a frame.

Figure 9:
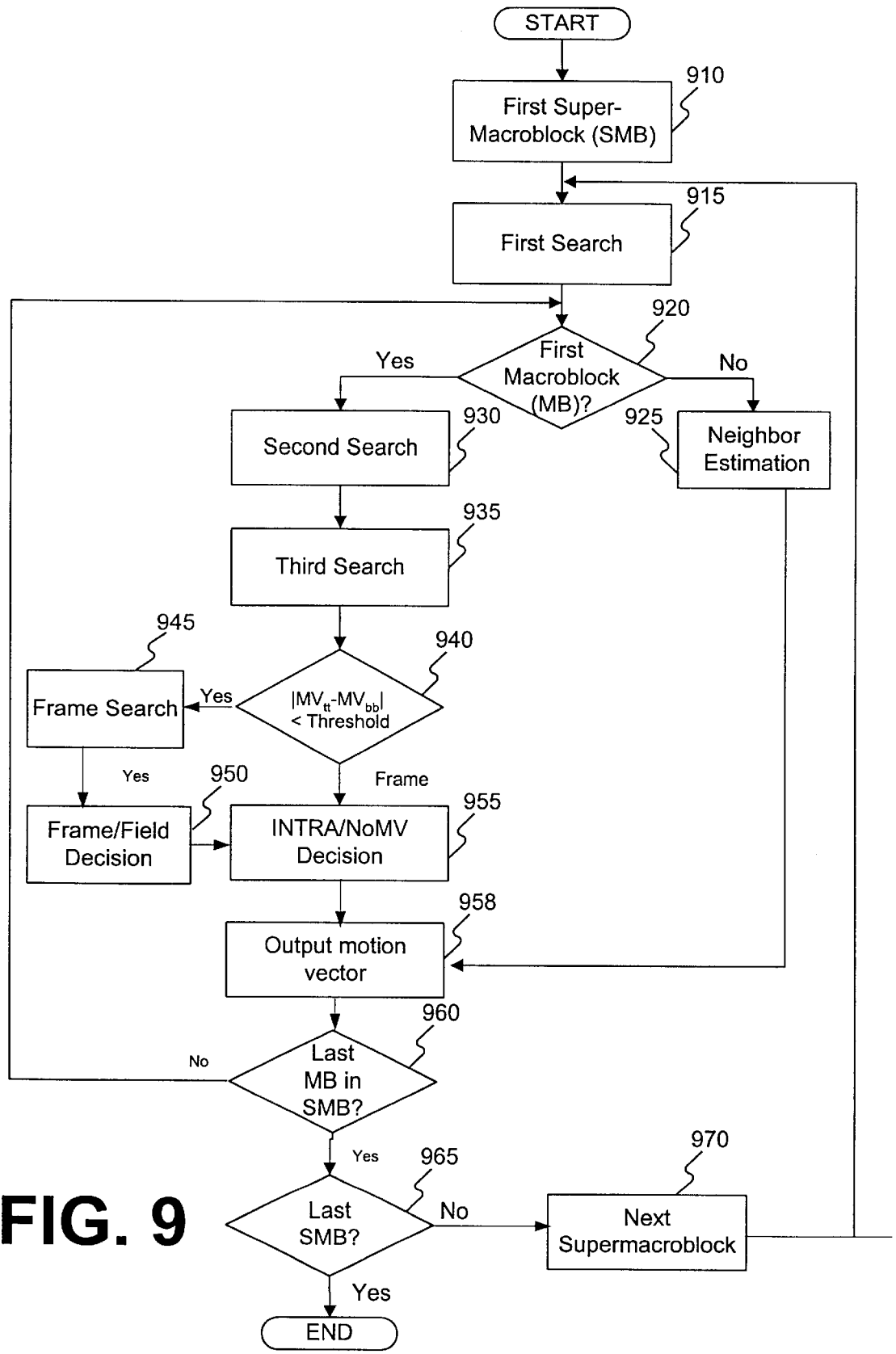
FIG. 9 is a flow diagram showing a method of determining motion vectors consistent with the present invention.

FIG. 9 contains a flow chart illustrating a method for estimating motion vectors for each macroblock of a current picture when the picture is encoded as two fields. As described above with respect to FIG. 4, data representing a current picture is divided into data representing supermacroblocks. If motion estimation is performed in the pixel domain (step 350 of FIG. 3), the data will be pixel data. If motion estimation is performed in the compressed domain (step 390 of FIG. 3), motion estimation will be performed using DCT coefficient data representing supermacroblocks.

Starting with a first supermacroblock (step 910), the reference picture is searched for a candidate supermacroblock that best matches the current supermacroblock (step 915). As described above with respect to step 415, a best candidate supermacroblock may be obtained using any available searching technique including, for example, a full search or a telescopic search. In one embodiment of the present invention, the "best" candidate supermacroblock is selected using the motion estimation method described.

Regardless of the search technique used, the current supermacroblock and candidate supermacroblocks may be compared using projection data to further reduce the number of necessary calculations, as described above. In step 915, integral projection information can be obtained by calculating one-dimensional integral projection arrays from either pixel information or discrete cosine transform (DCT) coefficient data.

After a best supermacroblock in the reference frame is determined, a motion vector for each macroblock (MB) in the current supermacroblock is determined. For a first macroblock of the supermacroblock in the current frame (step 920), the best candidate macroblock in a reference frame is determined using a second search technique (step 930). The motion vector found in the first search (step 915) is used as the starting point of the second search. The second search technique used may be any conventional search technique such as, for example, full search. In one embodiment of the present invention, the "best" candidate macroblock is selected using the technique described in Chang II. As mentioned above, the search range over which the search is performed may vary. Generally, a larger search range will increase accuracy but result in additional computations that may affect performance.

Generally, most search techniques used will search for the best candidate macroblock in both the horizontal and vertical directions. If converting from DV format to MPEG-2 interlaced fields, the underlying video may be encoded either as 8×8 frame data or 4×8 fields of data. Fields may be encoded separately or two fields may be taken together and treated as an 8×8 frame. Frame data is compressed using an 8×8 DCT mode whereas field data is generally compressed using a 2×4×8 DCT mode. The DV format specification recommends that the 8×8 DCT mode be used when the difference between two fields is small. By contrast, the 2×4×8 DCT mode should be used when two fields differ greatly.

Case I: 2×4×8 DCT mode

In one embodiment, the second search is performed using video field data that has been encoded in 2×4×8 DCT mode. To find a best candidate macroblock in the compressed domain, a reference picture is divided into horizontal strips of 8 rows, and is searched first in the horizontal direction using 8-point vertical field projection data beginning at the motion vector obtained from the first search. The top and bottom fields are searched separately. To obtain the 8-point vertical field projections for the top field, a one-dimensional 8-point horizontal iDCT is performed on the first row of the top 4×8 DCT block. The top 4×8 DCT block can be found by adding the sum 4×8 DCT block with the difference 4×8 DCT block. The sum 4×8 DCT block is the upper 4×8 portion of the 8×8 block whereas the difference 4×8 DCT block is the lower 4×8 portion of the 8×8 block as defined in the DV format. To obtain 8-point vertical field projections for the bottom field, a one-dimensional 8-point horizontal iDCT is performed on the first row of the bottom 4×8 DCT block. The bottom 4×8 DCT block can be found by subtracting the difference 4×8 DCT block from the sum 4×8 DCT block.

Beginning at the best candidate in each horizontal strip, a vertical search is performed. When calculating the SAD between each comparison, horizontal field projections for both the top and bottom fields are used. For example, 4-point horizontal field projections for the top field are determined by taking a one-dimensional (1-D) 4-point vertical iDCT of the first column of the top 4×8 DCT block. Four-point horizontal field projections for the bottom field are obtained by taking a 1-D 4-point vertical iDCT of the first column of the bottom 4×8 DCT block. The projections are used when computing the SAD and determining the best candidate macroblock.

The best candidate of all the candidates in the vertical search is used to determine the motion vector. This search is performed separately for both the top and bottom fields. The motion vector $MV_{tt}$ refers to the motion vector from the top field in the current frame to the top field in the reference frame, i.e top-top (TT). Correspondingly, motion vector $MV_{bb}$ is the motion vector from the bottom field in the current frame to the bottom field in the reference frame, i.e. bottom-bottom (BB)

It should be noted that the vertical and horizontal searches are interchangeable, that is, the horizontal search may be performed first and the vertical search second.

Case IIA: 8×8 DCT mode

In another embodiment, the second search is performed using video field data that has been encoded in 8×8 DCT mode. To find a best candidate macroblock in the compressed domain, a reference picture is divided into vertical strips of 8 columns, and is searched first in the vertical direction using 4-point horizontal field projection data beginning at the motion vector obtained from the first search. The top and bottom fields are searched separately. To obtain the 4-point horizontal field projections for the top field, even outputs of a one-dimensional 8-point vertical iDCT of the first column of an 8×8 DCT block are chosen. The odd outputs of the 1-D 8-point vertical iDCT of the first column of the 8×8 DCT block are used as the 4-point horizontal field projections for the bottom field. The horizontal field projects are used in calculating the SAD between each block comparison and determining best candidate macroblocks in each column.

Beginning at the best candidate in each vertical strip, a horizontal search is performed in the spatial domain separately for both the top and bottom fields. The search range is +/−4 pixels. The horizontal search may be performed using, for example, a full search algorithm. The SAD of spatial domain pixel information between the reference frame and the current frame is calculated for each candidate macroblock in the search range. Alternatively, the horizontal search may be performed using other search methods, such as logarithmic search.

The best candidate of all the candidates in the horizontal search is used to determine the motion vector. This search is performed separately for both the top and bottom fields, to find $MV_{tt}$ and $MV_{bb}$.

Case IIB: 8×8 DCT mode

In yet another embodiment consistent with the present invention, the second search is also performed using video field data that has been encoded in 8×8 DCT mode. However, to find a best candidate macroblock in the compressed domain, a reference picture is divided into horizontal strips of 8 rows, rather than vertical strips of 8 columns, and is searched first in the horizontal direction using 8-point vertical field projection data beginning at the motion vector obtained from the first search. The top and bottom fields are searched separately. In this embodiment, however, the pixel information is first derived by iDCT, then the 8-point vertical field projections for the top field are computed by summing the even rows of the macroblock. The 8-point vertical field projections for the bottom field are determined by summing the odd rows of the macroblock. The SADs of vertical field projections, instead of the SADs of pixel information in Case II A, are used to determine a best candidate for each horizontal strip.

Beginning at the best candidate in each horizontal strip, a vertical search is performed. When calculating the SAD between each comparison, horizontal field projections for both the top and bottom fields are used. In one example, 4-point horizontal field projections for the top field are determined by taking the even outputs of a 1-D 8-point vertical iDCT of the first column of the 8×8 DCT block. Four-point horizontal field projections for the bottom field are obtained by taking the odd outputs of a 1-D 8-point vertical iDCT of the first column of the 8×8 Dct block. The projections are used when computed the SAD and determined the best candidate macroblock for each column.

The best candidate of all the candidates in the vertical search is used to determine the motion vector. This search is performed separately for both the top and bottom fields. The motion vector $MV_{tt}$ refers to the motion vector from the top field in the current frame to the top field in the reference frame, i.e top-top (TT). Correspondingly, motion vector $MV_{bb}$ is the motion vector from the bottom field in the current frame to the bottom field in the reference frame, i.e. bottom-bottom (BB).

It should be noted that the vertical and horizontal searches are interchangeable, that is, the vertical search may be performed first and the horizontal search second.

Returning to FIG. 9, the results of the second search may be used as a starting point for an additional, optional third search such as, for example, a spatial domain search (step 935). The motion vector for the top block will be used as a starting point for a third search for the top block and the motion vector for the bottom block will be used as a starting point for a third search for a bottom block. The result of step 935 will be two motion vectors, $MV_{tt}$ (motion vector for the current top field) and $MV_{bb}$ (motion vector for the current bottom field).

As mentioned above with respect to the other searches described, the search range over which the search is performed may vary. Generally, a larger search range will increase accuracy but result in additional computations that may affect performance. However, at this stage, the objective is to further fine tune the motion vector and therefore a search range of approximately 0.5 pixels is preferred.

Since the underlying data is interlaced field data, a motion vector for the frame comprised of the top and bottom fields may also be calculated. In predicting motion vectors for field data, the MPEG-2 standard suggests that motion vectors should be determined for all of top-top (TT), bottom-bottom (BB), top-bottom (TB), bottom-top (BT) field comparisons, as well as the frame (i.e. the two fields taken together). While all four vectors may be determined, in one embodiment of the present invention, the steps of calculating motion vectors for TB and BT are eliminated as one means of further reducing calculations. In methods consistent with the present invention, for example, the frame search step is not performed if it is determined to be unnecessary or unlikely to improve the quality of the motion vector.

In step 940, the present invention includes a test for determining whether a frame prediction search is necessary. In step 940, if the absolute difference between motion vectors for the top and bottom fields, $MV_{tt}$ and $MV_{bb}$, is less than a threshold, the frame search should be performed. Frame prediction mode may provide better matching between a reference frame and a current frame when the reference frame is interpolated for half-pixel motion vectors. In frame prediction mode, only one frame motion vector needs to be encoded, instead of two field motion vectors in field in field prediction modes. This decision may be represented mathematically, for example, as if $|MV_{tt}-MV_{bb}|$<threshold, the frame search is worth performing.

A suitable threshold may be calculated or described in any number of ways, however, in one embodiment of the present invention, the threshold is dynamic. A dynamic threshold changes in response to the changing information in either preceding or succeeding fields. For example, consistent with the present invention, the threshold may be calculated as the weighted sum of the average of the absolute difference of the motion vectors for TT and BB of previous frames. This calculation may be represented mathematically as:

$$\text{Threshold}=\tfrac{1}{2}\text{*avg }|MV_{tt}-MV_{bb}|(N-1)+\tfrac{1}{4}\text{*avg }|MV_{tt}-MV_{bb}|(N-2)+$$
$$\tfrac{1}{8}\text{*avg }|MV_{tt}-MV_{bb}|(N-3)+\tfrac{1}{16}\text{*avg }|MV_{tt}-MV_{bb}|(N-4)+\ldots$$

where avg $|MV_{tt}-MV_{bb}|(N)$ is the average of the absolute difference of $MV_{tt}$ and $MV_{bb}$ for the Nth frame.

If it is determined in step 940 that frame prediction is desirable, a frame search is performed in step 945. The search in step 945 may be performed by any technique described earlier in association with steps 915, 930, or 935. In one embodiment of the present invention, the search performed is a spatial domain search similar to the search described in step 935. The starting motion vector for this frame search may be the motion vector for either the top field or the bottom field. In one embodiment consistent with this invention, the starting vector is chosen to be the average of motion vectors for the top and frame prediction, i.e. $(MV_{tt}+MV_{bb})/2$, and the search range is +/−1.5 pixels. Furthermore, a spatial domain search may be performed over any possible search range, however, generally at this point in the process there is little to be gained by using a large search range. In step 945, the frame search may be further improved by using a half-pel estimation process instead of full search.

Generally, when coding video sequences using a combination of frame and field data using conventional techniques, a higher priority is generally given to frame prediction data over field prediction data. This decision is known as the Frame/Field Decision (step 950).

The process continues with step 955 which is the Intra/NoMV decision. The Intra mode means the macroblock is encoded independently without reference to the reference pictures. When the SAD is small, Intra mode may produce better image quality than motion predicted mode. Therefore, the Intra mode is given higher priority when the SAD is small. The NoMV mode is a special case when the motion vector is zero. Since it takes the fewest number of bits to encode the zero motion vector, the zero motion vector is given higher priority than other motion vectors.

In step 958, the motion vector is stored or output. If the process has just determined the motion vector for the last macroblock in the current supermacroblock (step 960), the process continues with step 965. Otherwise, the process continues by determining motion vectors for the other macroblocks in the current supermacroblock (step 920).

Methods consistent with the present invention determine motion vectors for the second and succeeding macroblocks of a supermacroblock by estimation using the motion vectors from neighboring macroblocks (step 925). The process may determine the motion vectors for the second and succeeding macroblocks using any suitable combination of neighboring motion vectors including, for example, the average of two nearest neighbors. In one embodiment of the current invention, the motion vectors are determined using the method of utilizing motion vectors from neighboring motion vectors described in section C below.

When the process has determined the motion vector for the last macroblock in the current supermacroblock, the process continues with step 965. If the process has determined the motion vectors for the last supermacroblock in a given frame or field (step 965), the process terminates. Otherwise, the process chooses a next supermacroblock (step 970) and continues with step 915.

C. Determining Motion Vectors Based On Motion Vectors for Neighboring Macroblocks In a typical motion estimation process, each frame or field is encoded using multiple motion vectors, one for each of the multiple macroblocks in the frame or field. Any method of estimating motion vectors for a frame or field may be improved by determining some of the motion vectors using motion vectors for neighboring macroblocks consistent with the present invention. By determining some of the motion vectors in this manner, some computations are avoided.

Consistent with the present invention, for each macroblock in a frame or field, a decision is made whether to obtain the motion vector for that macroblock by performing a regular search or by estimation based on the motion vectors for neighboring macroblocks that have already been calculated. FIG. 10 shows one example of a method for determining motion vectors for each macroblock in a frame or field that consists of 16×6 macroblocks. In FIG. 10, to obtain the motion vector for macroblocks whose number appears in regular type, a regular search (step 930 to step 958) is performed. If the number of a macroblock appears in shaded, italic type with no underline, the motion vector for that macroblock is obtained based on the motion vectors of the left and right neighboring macroblocks. If the number appears underlined, the motion vector for that macroblock is obtained based on the motion vectors for macroblocks above and below the current macroblock. The numbers also indicate the order in which the motion vectors are determined.

For example, in FIG. 10, the first motion vector to be determined is for the macroblock in the upper left corner labeled "1". To obtain this motion vector, a regular search is performed. Next, a regular search is performed to obtain the motion vector for macroblock "2". The search may be performed, for example, beginning at the motion vector determined in step 915 for supermacroblock #2 and performing steps 930 through 958. At this point, two motion vectors have been obtained. The motion vector for macroblock "3" may be determined based on the motion vectors for macroblocks "1" and "2", that is, the left and right neighbors. This process continues for the entire first row. If, as shown in FIG. 10, there is an even number of macroblocks in the first row, the last macroblock in the first row is determined by performing a regular search, since there will be no "right neighbor" motion vector.

Following the last macroblock in the first row, the process determines the motion vector for the first macroblock in the third row. By determining the motion vectors for the third row before the second row, the entire second row of motion vectors may be determined using previously determined motion vectors. As shown in FIG. 10, after the motion vector for macroblock "17" is determined, the motion vector for macroblock "18" may be determined based on the motion vector for macroblocks "1" and "17", that is, the upper and lower neighboring macroblocks to macroblock "18". The motion vector for macroblock "19" is determined using a search. Following this determination, however, the motion vectors for macroblocks "20", "21", and "22" may be determined based on previously determined motion vectors. As shown in FIG. 10, the motion vector for macroblock "20" is determined based on upper and lower motion vectors for macroblocks "2" and "19" and motion vectors for macroblocks "21" and "22" are determined based on the motion vectors for left and right neighboring macroblocks "18" and "20" and "17" and "19", respectively.

The motion vectors for rows 2 and 3 may be determined in this order. In an alternative embodiment, motion vectors for the second row may be determined after determining motion vectors for the entire third row. Motion vectors for each macroblock in the frame or field are determined in this manner according to FIG. 10.

FIG. 11 shows one method for determining motion vectors based on previously determined motion vectors. As stated previously, motion vectors for some macroblocks may be determined based on the motion vectors for left and right neighboring macroblocks or upper and lower neighboring macroblocks. Each set of motion vectors may be, for example, averaged together to get a new motion vector. In one embodiment consistent with the present invention, previously determined motion vectors are used to determine a motion vector for the current macroblock according to the chart shown in FIG. 11. For example, $MV_1$ and $MV_2$ represent motion vectors for the left and right, or upper and lower, neighboring macroblocks. $MV_1$ and $MV_2$ may each be a motion vector either for a macroblock in a frame or a field. If either $MV_1$ and $MV_2$ are field vectors, the vertical component of the motion vector is converted into frame units by, for example, multiplying by 2, before Y is calculated.

In one embodiment of the present invention, a motion variation, Y, is calculated. In this embodiment, $Y=|MV_1-MV_2|$, which may also be expressed mathematically as:

$$Y=\sqrt{(x_1-x_2)+(y_1-y_2)}$$

If, for example, $MV_1=(x_1,y_2)=(1,1)$ and $MV_2=(x_1,y_2)=(2,4)$, then $Y=\sqrt{10}$. Using this formula for Y, suitable thresholds $T_1$, $T_2$, and $T_3$ include, for example, 1, 2, and 3, respectively.

If other formulas are used to calculate Y, other thresholds may be necessary. For example, the maximum of the x and y component differences may be alternatively used as Y. $Y=\max[|x_1-x_2|, |y_1-y_2|]$. Other suitable threshold equations include, for example, $Y=(x_1-x_2)^2+(y_1-y_2)^2$ and $Y=|x_1x_2|+|y_1-y_2|$.

If Y=0 (Case 0), the motion vector, $MV_1$ is chosen as the motion vector for the current macroblock. In an alternative embodiment, the motion vector for $MV_2$ is chosen.

In Case 1 of FIG. 11, Y is between a range of 0 and a first threshold, $T_1$. In Case 1, the motion vector for the current macroblock is chosen to be either $MV_1$ or $MV_2$, or the macroblock is coded independently of a reference picture, that is, "intra-coded." If intra coding will result in the least amount of information to be encoded, the macroblock is coded independently. If, however, coding motion vector $MV_1$ or $MV_2$ will require less information to be coded, $MV_1$ or $MV_2$ (whichever results in the minimum SAD) is used as the motion vector for the current macroblock.

In Case 2 of FIG. 11, Y is between a range of $T_1$ and a second threshold, $T_2$. In Case 2, the motion vector for the current macroblock is chosen to be either $MV_1$, $MV_2$, the average of $MV_1$ and $MV_2$, or the macroblock is coded independently of a reference picture, that is, "intra-coded." If intra coding will result in the least amount of information to be encoded, the macroblock is coded independently. If, however, coding motion vector $MV_1$, $MV_2$, or their average will require less information to be coded, $MV_1$, $MV_2$, or their average motion vector (whichever results in the minimum SAD) is used as the motion vector for the current macroblock.

If Y is between a range of $T_2$ and a third threshold, $T_3$, a frame or field search is performed, using the average of $MV_1$ and $MV_2$ as the starting motion vector. If both $MV_1$ and $MV_2$ are frame motion vectors, a frame search is performed. Otherwise, a field search is performed.

If Y is greater than $T_3$, a regular search is performed.

D. System

Figure 12:
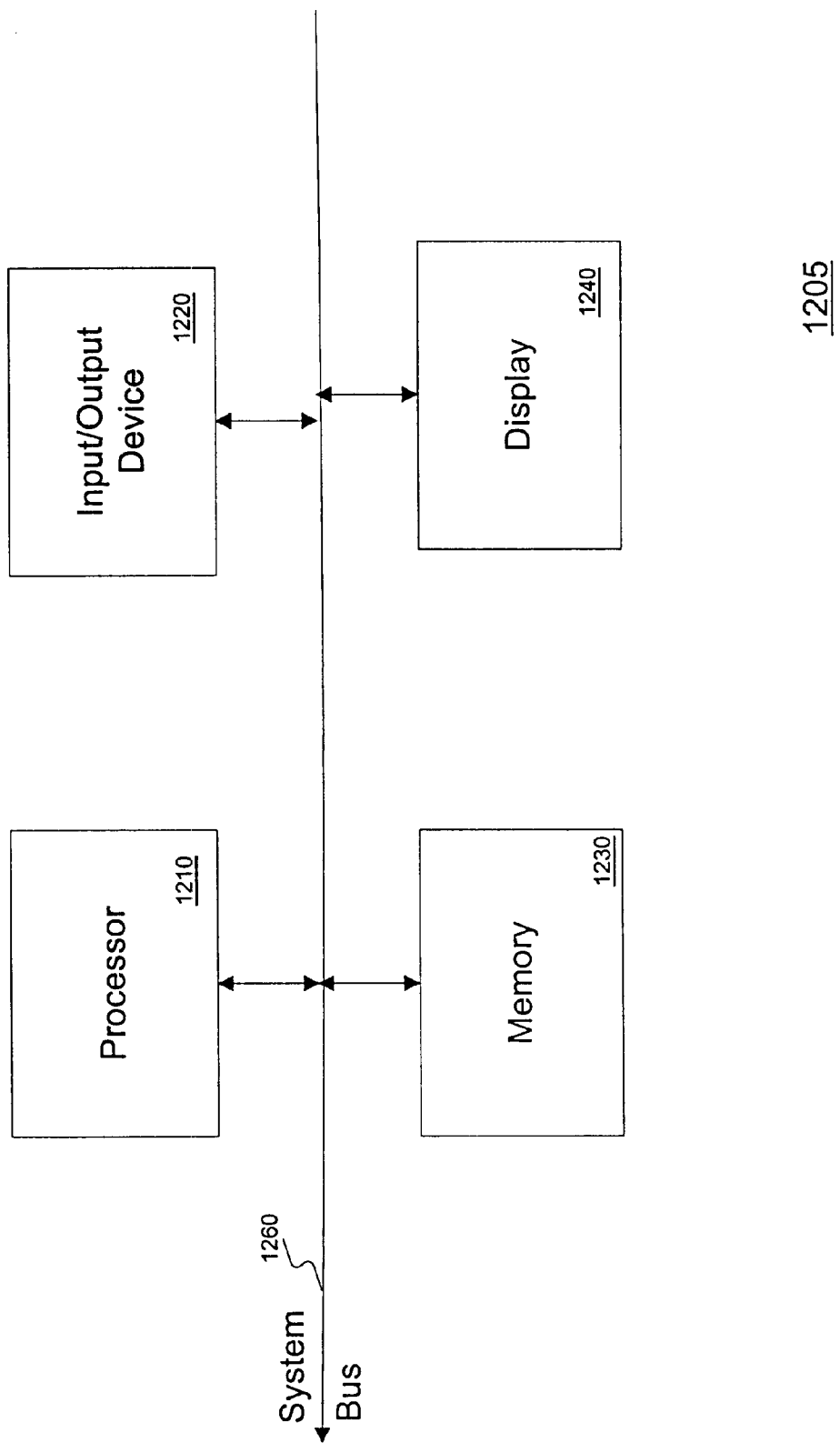
FIG. 12 is a diagram of a system consistent with the present invention.

FIG. 12 illustrates a system 1205 consistent with the present invention. As shown in FIG. 12, a processor 1210 is connected to at least one input/output (I/O) device 1220 via any suitable data connection. I/O device 1220 can be any device capable of passing information to or receiving data from processor 1210. By way of example only, I/O device 1220 may be a digital camcorder connected through IEEE 1394 interface. Processor 1210 may be any commonly available digital processor. Processor 1210 may be a single processor or multiple processors. Faster processors, however, will decrease execution time of the invention. Moreover, special purpose processors optimized for image data processing may be preferred in certain applications.

The system of the present invention also includes memory 1230 capable of storing data processed by processor 1210 and data sent to or received from I/O device 1220. System 1205 may be connected to a display 1240, such as a cathode ray tube (CRT), for displaying information. Processor 1210, I/O device 1220, memory 1230, and display 1240 are connected via a standard system bus 1260. FIG. 12 shows an exemplary network where each hardware component may be implemented by conventional; commercially available computer systems components.

Figure 13:
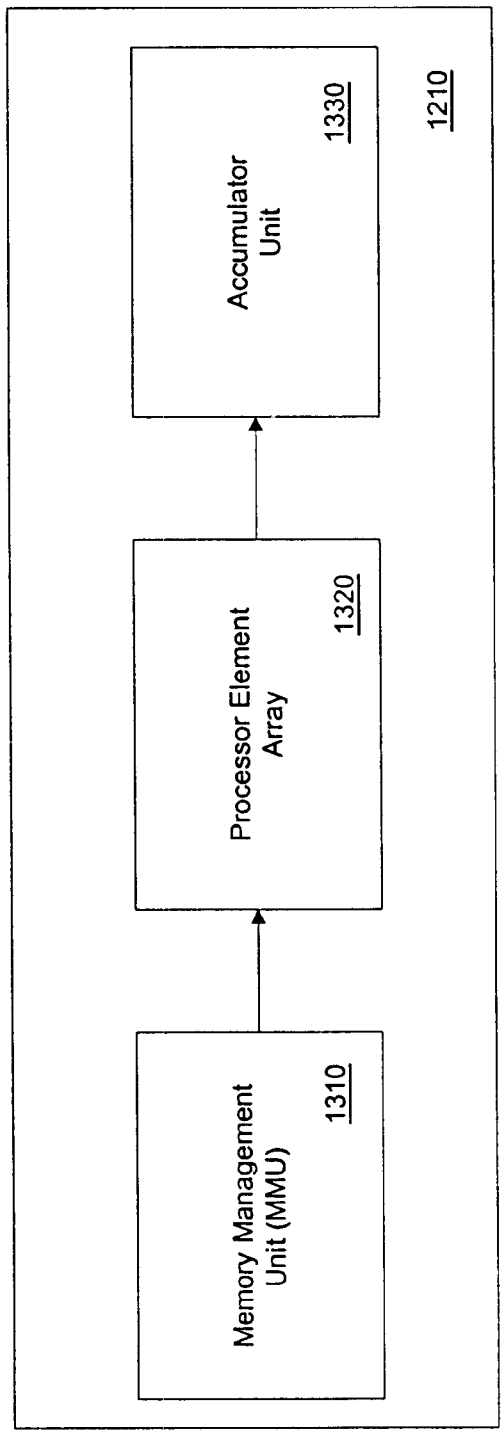
FIG. 13 is a diagram of a processor consistent with the present invention.

FIG. 13 illustrates processor 1210 consistent with the present invention. Processor 1210 may comprise one or more memory management units (MMU) 1310, one or more processor element arrays 1320, and one or more accumulator units 1330. Processor element array 1320 may comprise an array of processor elements, not shown. Processor elements may comprise, for example, a subtraction and adder units for calculating the SAD between the blocks. MMU 1310 may be used to buffer the data for processor element array 1320. Accumulator unit 1330 may be, for example, an adder unit that adds the outputs from processor element array 1325.

Referring again to FIG. 12, processor 1210 executes one or more sequences of one or more instructions contained in memory 1230. Such instructions may be read into memory 1230 from a computer-readable medium via input/output device 1220. Execution of the sequences of instructions contained in memory 1230 causes processor 1210 to perform the process steps described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 1210 for execution. Such a medium may take many forms, including but not limited to, non-volatile media, volatile media, and transmission media. Non-volatile media includes, for example, optical or magnetic disks. Volatile media includes dynamic memory, such as memory 1230. Transmission media includes coaxial cables, copper wire, and fiber optics, including the wires that comprise system bus 1260. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read. Network signals carrying digital data, and possibly program code, to and from system 1205 through system bus 1260 are exemplary forms of carrier waves transporting the information. In accordance with the present invention, program code received by system 1205 may be executed by processor 1210 as it is received, and/or stored in memory 1230, or other non-volatile storage for later execution.

It will be apparent to those skilled in the art that various modifications and variations can be made in the methods and systems consistent with the present invention without departing from the spirit or scope of the invention. The true scope of the invention is defined by the following claims.

What is claimed is:

1. A method for obtaining a motion vector between first and second pictures of video image data in a video sequence, each picture including a plurality of macroblocks, the method comprising the steps of:

determining a first motion vector for a first macroblock using a first search method;

determining a second motion vector for a second macroblock using a second search method;

estimating a third motion vector for a third macroblock neighboring both the first and second macroblocks, the third motion vector based on the first and second motion vectors;

determining a fourth motion vector for a fourth macroblock using a third search method; and estimating a fifth motion vector for a fifth macroblock neighboring both the first and fourth macroblocks, the fifth motion vector based on the first and fourth motion vectors.

2. A method for obtaining a motion vector between first and second pictures of video image data in a video sequence, each picture including a plurality of macroblocks, the method comprising the steps of:

determining a first motion vector for a first macroblock using a first search method;

determining a second motion vector for a second macroblock using a second search method;

estimating a third motion vector for a third macroblock neighboring both the first and second macroblocks, the third motion vector based on the first and second motion vectors;

determining a fourth motion vector for a fourth macroblock using a third search method; and estimating a fifth motion vector for a fifth macroblock neighboring both the second and fourth macroblocks, the fifth motion vector based on the second and fourth motion vectors.

3. The method of claim 1, further comprising:
determining a sixth motion vector for a sixth macroblock using a fourth search method; and
estimating a seventh motion vector for a seventh macroblock neighboring the sixth macroblock and at least one of the second and fourth macroblocks, the seventh motion vector based on the sixth motion vector and at least one of the second and fourth motion vectors.

4. The method of claim 2, further comprising:
determining a sixth motion vector for a sixth macroblock using a fourth search method; and
estimating a seventh motion vector for a seventh macroblock neighboring the sixth macroblock and at least one of the first and fourth macroblocks, the seventh motion vector based on the sixth motion vector and at least one of the first and fourth motion vectors.

5. The method of claim 3, further comprising:
estimating an eighth motion vector for a eighth macroblock neighboring the sixth macroblock and at least one of the second and fourth macroblocks, the eighth motion vector based on the sixth motion vector and at least one of the second and fourth motion vectors.

6. The method of claim 4, further comprising:
estimating an eighth motion vector for a eighth macroblock neighboring the sixth macroblock and at least one of the first and fourth macroblocks, the eighth motion vector based on the sixth motion vector and at least one of the first and fourth motion vectors.

7. The method of claim 5 or 6, further comprising:
estimating a ninth motion vector for a ninth macroblock neighboring each of the first eight macroblocks, the ninth motion vector based on at least two of the first eight motion vectors.

8. The method of claim 1, 2, 3, 4, 5, or 6, wherein the step of estimating comprises:
determining a motion value based on first and second motion vectors; and
encoding the third macroblock using one of the following methods:
encoding the first motion vector, if the motion value equals zero;
if the motion value is greater than zero but less than or equal to a first threshold, selecting the minimum of the first motion vector, the second motion vector, or encoding the third macroblock independently of the first or second pictures;
if the motion value is greater than the first threshold but less than or equal to a second threshold, selecting the minimum of the first motion vector, the second motion vector, an average of the first and second motion vectors, or encoding the third macroblock independently of the first or second pictures;
if the motion value is greater than the second threshold but less than or equal to a third threshold, searching for a best candidate macroblock in the second picture using the average between the first and second motion vectors as the starting motion vector; and
if the motion value is greater than the third threshold, searching for a best candidate macroblock in the second picture.

9. A method for encoding a third macroblock, the method comprising the steps of:
determining first and second motion vectors, the first motion vector representing displacement of a first macroblock in a first picture of a video sequence to a second picture of a video sequence and a second motion vector displacement of a second macroblock in the first picture to the second picture;
determining a motion value based on first and second motion vectors;
comparing the motion value to at least one threshold; and
encoding the third macroblock using one of the following methods:
encoding the first motion vector, if the motion value equals zero; and
if the motion value is greater than zero but less than or equal to a first threshold, selecting the minimum of:
the first motion vector, the second motion vector, or encoding the third macroblock independently of the first or second pictures.

10. A method for encoding a third macroblock, the method comprising the steps of:
determining first and second motion vectors, the first motion vector representing displacement of a first macroblock in a first picture of a video sequence to a second picture of a video sequence and a second motion vector displacement of a second macroblock in the first picture to the second picture;
determining a motion value based on first and second motion vectors;
comparing the motion value to at least one threshold; and
encoding the third macroblock using one of the following methods:
encoding the first motion vector, if the motion value equals zero; and
if the motion value is greater than zero but less than or equal to a first threshold, selecting the minimum of:
the first motion vector, the second motion vector, or encoding the third macroblock independently of the first or second pictures; and
if the motion value is greater than the first threshold but less than or equal to a second threshold, selecting the minimum of:
the first motion vector, the second motion vector, an average of the first and second motion vectors, or encoding the third macroblock independently of the first or second pictures.

11. The method of claim 10, wherein the step of encoding the third macroblock using one of the following methods further comprises:
if the motion value is greater than the second threshold but less than or equal to a third threshold, searching for a best candidate macroblock in the second picture.

12. The method of claim 11, wherein the step of searching for a best candidate macroblock in the second picture is performed using the average between the first and second motion vectors as the starting motion vector.

13. The method of claim 11, wherein the step of encoding the third macroblock using one of the following methods further comprises:
if the motion value is greater than the third threshold, searching for a best candidate macroblock in the second picture.

14. An apparatus for obtaining a motion vector between first and second pictures of video image data in a video sequence, each picture including a plurality of macroblocks, the apparatus comprising a memory having program instructions:
a memory having program instructions, and
a processor configured to use the program instructions to perform the steps of:

determining a first motion vector for a first macroblock using a first search method;
determining a second motion vector for a second macroblock using a second search method;
estimating a third motion vector for a third macroblock neighboring both the first and second macroblocks, the third motion vector based on the first and second motion vectors;
determining a fourth motion vector for a fourth macroblock using a third search method; and
estimating a fifth motion vector for a fifth macroblock neighboring both the first and fourth macroblocks, the fifth motion vector based on the first and fourth motion vectors.

15. An apparatus for obtaining a motion vector between first and second pictures of video image data in a video sequence, each picture including a plurality of macroblocks, the apparatus comprising a memory having program instructions:
a memory having program instructions, and
a processor configured to use the program instructions to perform the steps of:
determining a first motion vector for a first macroblock using a first search method;
determining a second motion vector for a second macroblock using a second search method;
estimating a third motion vector for a third macroblock neighboring both the first and second macroblocks, the third motion vector based on the first and second motion vectors;
determining a fourth motion vector for a fourth macroblock using a third search method; and
estimating a fifth motion vector for a fifth macroblock neighboring both the second and fourth macroblocks, the fifth motion vector based on the second and fourth motion vectors.

16. The apparatus of claim 14, wherein the processor is configured to use program instructions to perform the steps of:
determining a sixth motion vector for a sixth macroblock using a fourth search method; and
estimating a seventh motion vector for a seventh macroblock neighboring the sixth macroblock and at least one of the second and fourth macroblocks, the seventh motion vector based on the sixth motion vector and at least one of the second and fourth motion vectors.

17. The apparatus of claim 15, wherein the processor is configured to use program instructions to perform the steps of:
determining a sixth motion vector for a sixth macroblock using a fourth search method; and
estimating a seventh motion vector for a seventh macroblock neighboring the sixth macroblock and at least one of the first and fourth macroblocks, the seventh motion vector based on the sixth motion vector and at least one of the first and fourth motion vectors.

18. The apparatus of claim 16, wherein the processor is configured to use program instructions to perform the steps of:
estimating an eighth motion vector for a eighth macroblock neighboring the sixth macroblock and at least one of the second and fourth macroblocks, the eighth motion vector based on the sixth motion vector and at least one of the second and fourth motion vectors.

19. The apparatus of claim 17, wherein the processor is configured to use program instructions to perform the steps of:
estimating an eighth motion vector for a eighth macroblock neighboring the sixth macroblock and at least one of the first and fourth macroblocks, the eighth motion vector based on the sixth motion vector and at least one of the first and fourth motion vectors.

20. The apparatus of claim 18 or 19, wherein the processor is configured to use program instructions to perform the steps of:
estimating a ninth motion vector for a ninth macroblock neighboring each of the first eight macroblocks, the ninth motion vector based on at least two of the first eight motion vectors.

21. The apparatus of claim 14, 15, 16, 17, 18, or 19, wherein the processor is configured to use program instructions to perform the steps of:
determining a motion value based on first and second motion vectors;
encoding the third macroblock using one of the following methods:
encoding the first motion vector, if the motion value equals zero;
if the motion value is greater than zero but less than or equal to a first threshold, selecting the minimum of the first motion vector, the second motion vector, or encoding the third macroblock independently of the first or second pictures;
if the motion value is greater than the first threshold but less than or equal to a second threshold, selecting the minimum of the first motion vector, the second motion vector, an average of the first and second motion vectors, or encoding the third macroblock independently of the first or second pictures;
if the motion value is greater than the second threshold but less than or equal to a third threshold, searching for a best candidate macroblock in the second picture using the average between the first and second motion vectors as the starting motion vector; and
if the motion value is greater than the third threshold, searching for a best candidate macroblock in the second picture.

22. An apparatus for encoding a third macroblock, the apparatus comprising:
a memory having program instructions, and a processor configured to use the program instructions to perform the steps of:
determining first and second motion vectors, the first motion vector representing displacement of a first macroblock in a first picture of a video sequence to a second picture of a video sequence and a second motion vector displacement of a second macroblock in the first picture to the second picture;
determining a motion value based on first and second motion vectors;
comparing the motion value to at least one threshold; and
encoding the third macroblock using one of the following methods:
encoding the first motion vector, if the motion value equals zero; and
if the motion value is greater than zero but less than or equal to a first threshold, selecting the minimum of:
the first motion vector, the second motion vector, or encoding the third macroblock independently of the first or second pictures.

23. An apparatus for encoding a third macroblock, the apparatus comprising:

a memory having program instructions, and a processor configured to use the program instructions to perform the steps of:

determining first and second motion vectors, the first motion vector representing displacement of a first macroblock in a first picture of a video sequence to a second picture of a video sequence and a second motion vector displacement of a second macroblock in the first picture to the second picture;

determining a motion value based on first and second motion vectors;

comparing the motion value to at least one threshold; and encoding the third macroblock using one of the following methods:

encoding the first motion vector, if the motion value equals zero; and if the motion value is greater than zero but less than or equal to a first threshold, selecting the minimum of:

the first motion vector, the second motion vector, or encoding the third macroblock independently of the first or second pictures; and if the motion value is greater than the first threshold but less than or equal to a second threshold, selecting the minimum of:

the first motion vector, the second motion vector, an average of the first and second motion vectors, or encoding the third macroblock independently of the first or second pictures.

24. The apparatus of claim 23, wherein the step of encoding the third macroblock using one of the following methods further comprises:

if the motion value is greater than the second threshold but less than or equal to a third threshold, searching for a best candidate macroblock in the second picture.

25. The apparatus of claim 24, wherein the step of searching for a best candidate macroblock in the second picture is performed using the average between the first and second motion vectors as the starting motion vector.

26. The apparatus of claim 24, wherein the step of encoding the third macroblock using one of the following methods further comprises:

if the motion value is greater than the third threshold, searching for a best candidate macroblock in the second picture.

27. A computer program product comprising:

a computer-usable medium having computer-readable code embodied therein for obtaining a motion vector between first and second pictures of video image data in a video sequence, each picture including a plurality of macroblocks, the computer-usable medium comprising:

(a) a component configured to determine a first motion vector for a first macroblock using a first search method;

(b) a component configured to determine a second motion vector for a second macroblock using a second search method; and (c) a component configured to estimate a third motion vector for a third macroblock neighboring both the first and second macroblocks, the third motion vector based on the first and second motion vectors;

(d) a component configured to determine a fourth motion vector for a fourth macroblock using a third search method; and (e) a component configured to estimate a fifth motion vector for a fifth macroblock neighboring both the first and fourth macroblocks, the fifth motion vector based on the first and fourth motion vectors.

28. A computer program product comprising:

a computer-usable medium having computer-readable code embodied therein for obtaining a motion vector between first and second pictures of video image data in a video sequence, each picture including a plurality of macroblocks, the computer-usable medium comprising:

(a) a component configured to determine a first motion vector for a first macroblock using a first search method;

(b) a component configured to determine a second motion vector for a second macroblock using a second search method; and (c) a component configured to estimate a third motion vector for a third macroblock neighboring both the first and second macroblocks, the third motion vector based on the first and second motion vectors;

(d) a component configured to determine a fourth motion vector for a fourth macroblock using a third search method; and (e) a component configured to estimate a fifth motion vector for a fifth macroblock neighboring both the second and fourth macroblocks, the fifth motion vector based on the second and fourth motion vectors.

29. The product of claim 27, further comprising:

(f) a component configured to determine a sixth motion vector for a sixth macroblock using a fourth search method; and (g) a component configured to estimate a seventh motion vector for a seventh macroblock neighboring the sixth macroblock and at least one of the second and fourth macroblocks, the seventh motion vector based on the sixth motion vector and at least one of the second and fourth motion vectors.

30. The product of claim 28, further comprising:

(f) a component configured to determine a sixth motion vector for a sixth macroblock using a fourth search method; and (g) a component configured to estimate a seventh motion vector for a seventh macroblock neighboring the sixth macroblock and at least one of the first and fourth macroblocks, the seventh motion vector based on the sixth motion vector and at least one of the first and fourth motion vectors.

31. The product of claim 29, further comprising:

(h) a component configured to estimate an eighth motion vector for a eighth macroblock neighboring the sixth macroblock and at least one of the second and fourth macroblocks, the eighth motion vector based on the sixth motion vector and at least one of the second and fourth motion vectors.

32. The product of claim 30, further comprising:

(h) a component configured to estimate an eighth motion vector for a eighth macroblock neighboring the sixth macroblock and at least one of the first and fourth macroblocks, the eighth motion vector based on the sixth motion vector and at least one of the first and fourth motion vectors.

33. The product of claim 29 or 30, further comprising:

(i) a component configured to estimate a ninth motion vector for a ninth macroblock neighboring each of the first eight macroblocks, the ninth motion vector based on at least two of the first eight motion vectors.

34. The product of claim 27, 28, 29, 30, 31, or 32, wherein the step of estimating comprises:
   determining a motion value based on first and second motion vectors;
   encoding the third macroblock using one of the following methods:
      encoding the first motion vector, if the motion value equals zero;
      if the motion value is greater than zero but less than or equal to a first threshold, selecting the minimum of the first motion vector, the second motion vector, or encoding the third macroblock independently of the first or second pictures;
      if the motion value is greater than the first threshold but less than or equal to a second threshold, selecting the minimum of the first motion vector, the second motion vector, an average of the first and second motion vectors, or encoding the third macroblock independently of the first or second pictures;
      if the motion value is greater than the second threshold but less than or equal to a third threshold, searching for a best candidate macroblock in the second picture using the average between the first and second motion vectors as the starting motion vector; and
      if the motion value is greater than the third threshold, searching for a best candidate macroblock in the second picture.

35. A computer program product comprising:
   a computer-usable medium having computer-readable code embodied therein for encoding a third macroblock, the computer-usable medium comprising:
      (a) a component configured to determine first and second motion vectors, the first motion vector representing displacement of a first macroblock in a first picture of a video sequence to a second picture of a video sequence and a second motion vector displacement of a second macroblock in the first picture to the second picture;
      (b) a component configured to determine a motion value based on first and second motion vectors; and
      (c) a component configured to encode the third macroblock using one of the following methods:
         encoding the first motion vector, if the motion value equals zero; and
         if the motion value is greater than zero but less than or equal to a first threshold, selecting the minimum of:
            the first motion vector, the second motion vector, or encoding the third macroblock independently of the first or second pictures.

36. A computer program product comprising:
   a computer-usable medium having computer-readable code embodied therein for encoding a third macroblock, the computer-usable medium comprising:
      (a) a component configured to determine first and second motion vectors, the first motion vector representing displacement of a first macroblock in a first picture of a video sequence to a second picture of a video sequence and a second motion vector displacement of a second macroblock in the first picture to the second picture;
      (b) a component configured to determine a motion value based on first and second motion vectors; and
      (c) a component configured to encode the third macroblock using one of the following methods:
         encoding the first motion vector, if the motion value equals zero; and
         if the motion value is greater than zero but less than or equal to a first threshold, selecting the minimum of:
            the first motion vector, the second motion vector, or encoding the third macroblock independently of the first or second pictures; and
         if the motion value is greater than the first threshold but less than or equal to a second threshold, selecting the minimum of:
            the first motion vector, the second motion vector, an average of the first and second motion vectors, or encoding the third macroblock independently of the first or second pictures.

37. The product of claim 36, wherein the step of encoding the third macroblock using one of the following methods further comprises:
   if the motion value is greater than the second threshold but less than or equal to a third threshold, searching for a best candidate macroblock in the second picture.

38. The product of claim 37, wherein the step of searching for a best candidate macroblock in the second picture is performed using the average between the first and second motion vectors as the starting motion vector.

39. The product of claim 37, wherein the step of encoding the third macroblock using one of the following methods further comprises:
   if the motion value is greater than the third threshold, searching for a best candidate macroblock in the second picture.

40. A system for obtaining a motion vector between first and second pictures of video image data in a video sequence, each picture including a plurality of macroblocks, the systems comprising:
   means for determining a first motion vector for a first macroblock using a first search method;
   means for determining a second motion vector for a second macroblock using a second search method;
   means for estimating a third motion vector for a third macroblock neighboring both the first and second macroblocks, the third motion vector based on the first and second motion vectors;
   means for determining a fourth motion vector for a fourth macroblock using a third search method; and
   means for estimating a fifth motion vector for a fifth macroblock neighboring both the first and fourth macroblocks, the fifth motion vector based on the first and fourth motion vectors.

41. A system for obtaining a motion vector between first and second pictures of video image data in a video sequence, each picture including a plurality of macroblocks, the systems comprising:
   means for determining a first motion vector for a first macroblock using a first search method;
   means for determining a second motion vector for a second macroblock using a second search method;
   means for estimating a third motion vector for a third macroblock neighboring both the first and second macroblocks, the third motion vector based on the first and second motion vectors;
   means for determining a fourth motion vector for a fourth macroblock using a third search method; and
   means for estimating a fifth motion vector for a fifth macroblock neighboring both the second and fourth macroblocks, the fifth motion vector based on the second and fourth motion vectors.

42. The system of claim 40, further comprising:
means for determining a sixth motion vector for a sixth macroblock using a fourth search method; and
means for estimating a seventh motion vector for a seventh macroblock neighboring the sixth macroblock and at least one of the second and fourth macroblocks, the seventh motion vector based on the sixth motion vector and at least one of the second and fourth motion vectors.

43. The system of claim 41, further comprising:
means for determining a sixth motion vector for a sixth macroblock using a fourth search method; and
means for estimating a seventh motion vector for a seventh macroblock neighboring the sixth macroblock and at least one of the first and fourth macroblocks, the seventh motion vector based on the sixth motion vector and at least one of the first and fourth motion vectors.

44. The system of claim 42, further comprising:
means for estimating an eighth motion vector for a eighth macroblock neighboring the sixth macroblock and at least one of the second and fourth macroblocks, the eighth motion vector based on the sixth motion vector and at least one of the second and fourth motion vectors.

45. The system of claim 43, further comprising:
means for estimating an eighth motion vector for a eighth macroblock neighboring the sixth macroblock and at least one of the first and fourth macroblocks, the eighth motion vector based on the sixth motion vector and at least one of the first and fourth motion vectors.

46. The system of claim 44 or 45, further comprising:
means for estimating a ninth motion vector for a ninth macroblock neighboring each of the first eight macroblocks, the ninth motion vector based on at least two of the first eight motion vectors.

47. The system of claim 40, 41, 42, 43, 44, or 45, wherein means for estimating comprises:
means for determining a motion value based on first and second motion vectors;
means for encoding the third macroblock using one of the following methods:
encoding the first motion vector, if the motion value equals zero;
if the motion value is greater than zero but less than or equal to a first threshold, selecting the minimum of the first motion vector, the second motion vector, or encoding the third macroblock independently of the first or second pictures;
if the motion value is greater than the first threshold but less than or equal to a second threshold, selecting the minimum of the first motion vector, the second motion vector, an average of the first and second motion vectors, or encoding the third macroblock independently of the first or second pictures;
if the motion value is greater than the second threshold but less than or equal to a third threshold, searching for a best candidate macroblock in the second picture using the average between the first and second motion vectors as the starting motion vector; and
if the motion value is greater than the third threshold, searching for a best candidate macroblock in the second picture.

48. A system for encoding a third macroblock, the system comprising:
means for determining first and second motion vectors, the first motion vector representing displacement of a first macroblock in a first picture of a video sequence to a second picture of a video sequence and a second motion vector displacement of a second macroblock in the first picture to the second picture;
means for determining a motion value based on first and second motion vectors;
means for comparing the motion value to at least one threshold; and
means for encoding the third macroblock using one of the following methods:
encoding the first motion vector, if the motion value equals zero; and
if the motion value is greater than zero but less than or equal to a first threshold, selecting the minimum of:
the first motion vector, the second motion vector, or encoding the third macroblock independently of the first or second pictures.

49. A system for encoding a third macroblock, the system comprising:
means for determining first and second motion vectors, the first motion vector representing displacement of a first macroblock in a first picture of a video sequence to a second picture of a video sequence and a second motion vector displacement of a second macroblock in the first picture to the second picture;
means for determining a motion value based on first and second motion vectors;
means for comparing the motion value to at least one threshold; and
means for encoding the third macroblock using one of the following methods:
encoding the first motion vector, if the motion value equals zero; and
if the motion value is greater than zero but less than or equal to a first threshold, selecting the minimum of:
the first motion vector, the second motion vector, or encoding the third macroblock independently of the first or second pictures; and
if the motion value is greater than the first threshold but less than or equal to a second threshold, means for selecting the minimum of:
the first motion vector, the second motion vector, an average of the first and second motion vectors, or encoding the third macroblock independently of the first or second pictures.

50. The system of claim 49, wherein means for encoding the third macroblock using one of the following methods further comprises:
if the motion value is greater than the second threshold but less than or equal to a third threshold, means for searching for a best candidate macroblock in the second picture.

51. The system of claim 50, wherein means for searching for a best candidate macroblock in the second picture includes means for using the average between the first and second motion vectors as the starting motion vector.

52. The system of claim 50, wherein means for encoding the third macroblock using one of the following methods further comprises:
if the motion value is greater than the third threshold, means for searching for a best candidate macroblock in the second picture.

* * * * *

UNITED STATES PATENT AND TRADEMARK OFFICE
CERTIFICATE OF CORRECTION

PATENT NO.    : 6,671,319 B1
DATED         : December 30, 2003
INVENTOR(S)   : Ching-Fang Chang and Naofumi Yanagihara It is certified that error appears in the above-identified patent and that said Letters Patent is hereby corrected as shown below:

Column 19,
Lines 19 and 25, "a eighth" should read -- an eighth --.

Column 21,
Line 63, "a eighth" should read -- an eighth --.

Column 22,
Line 4, "a eighth" should read -- an eighth --.

Column 24,
Lines 53 and 60, "a eighth" should read -- an eighth --.

Column 27,
Lines 19 and 26, "a eighth" should read -- an eighth --.

Signed and Sealed this

Twenty-fourth Day of February, 2004

JON W. DUDAS
*Acting Director of the United States Patent and Trademark Office*